Aug. 28, 1934.  G. H. TABER  1,971,541
MEANS FOR CONTROLLING THE SUPPORTING STRENGTH
OF RESILIENT VEHICLE SUPPORTING MEANS
Filed Jan. 5, 1933  5 Sheets-Sheet 1
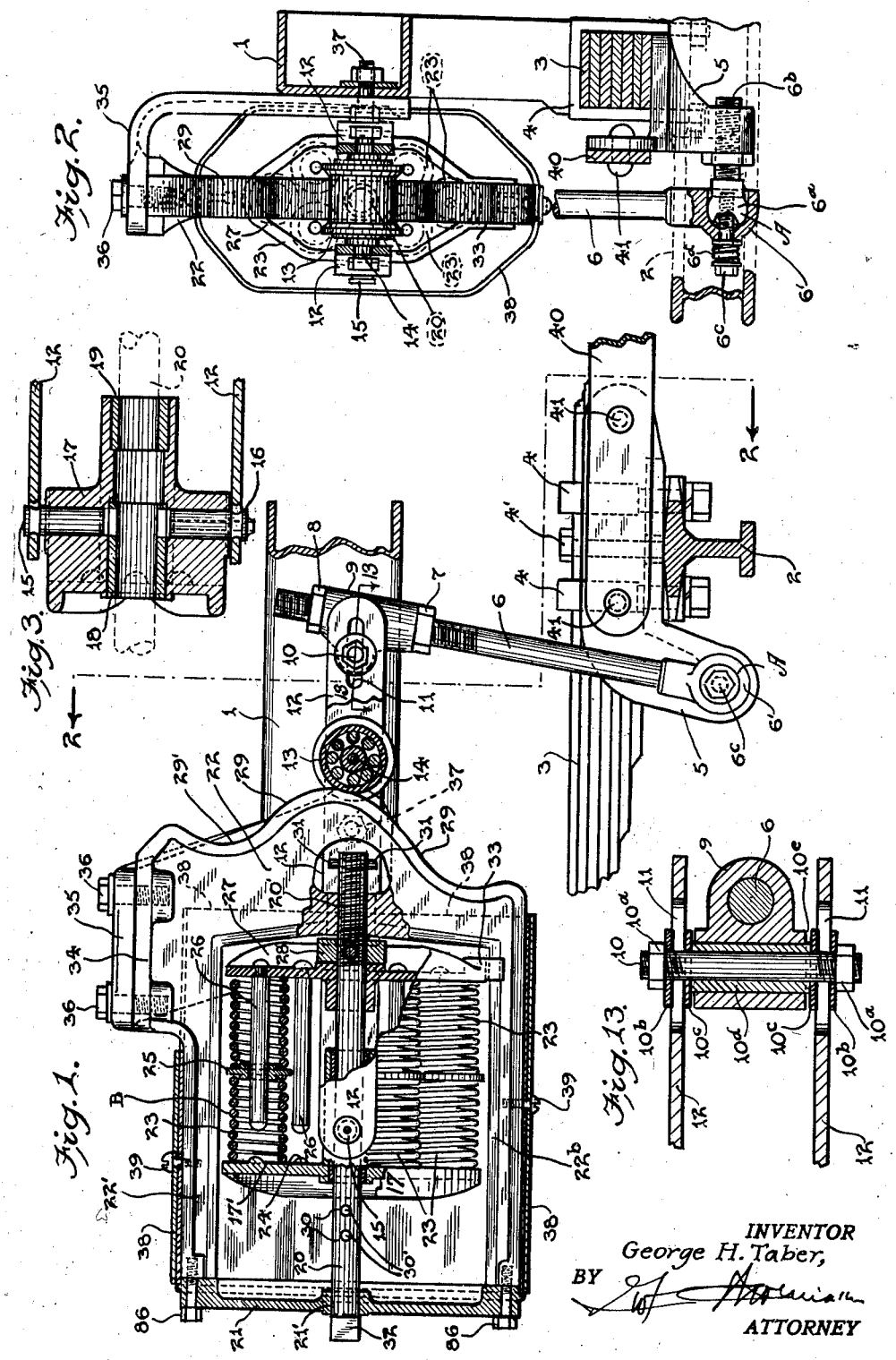
INVENTOR
George H. Taber,
BY 
ATTORNEY

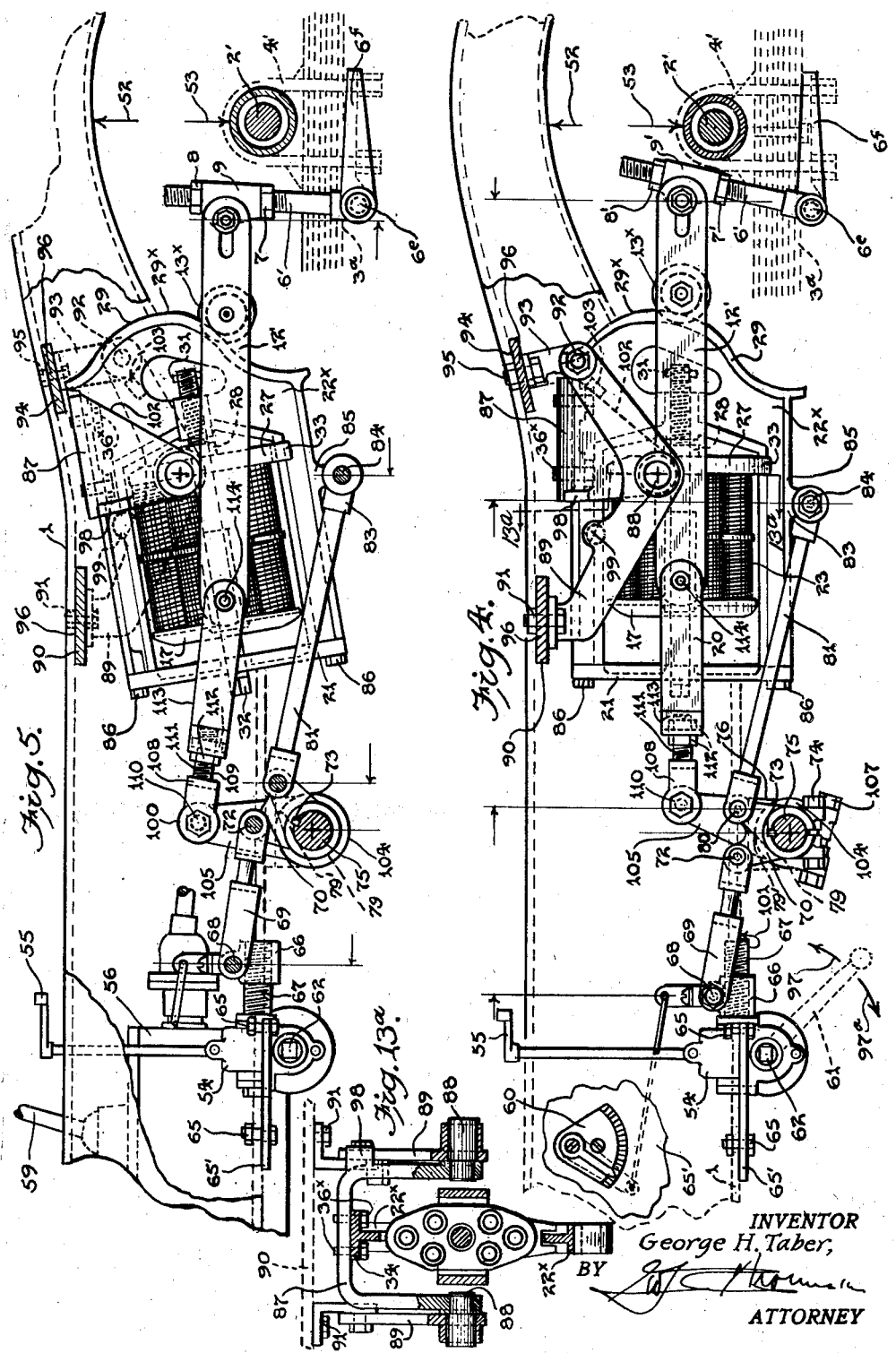

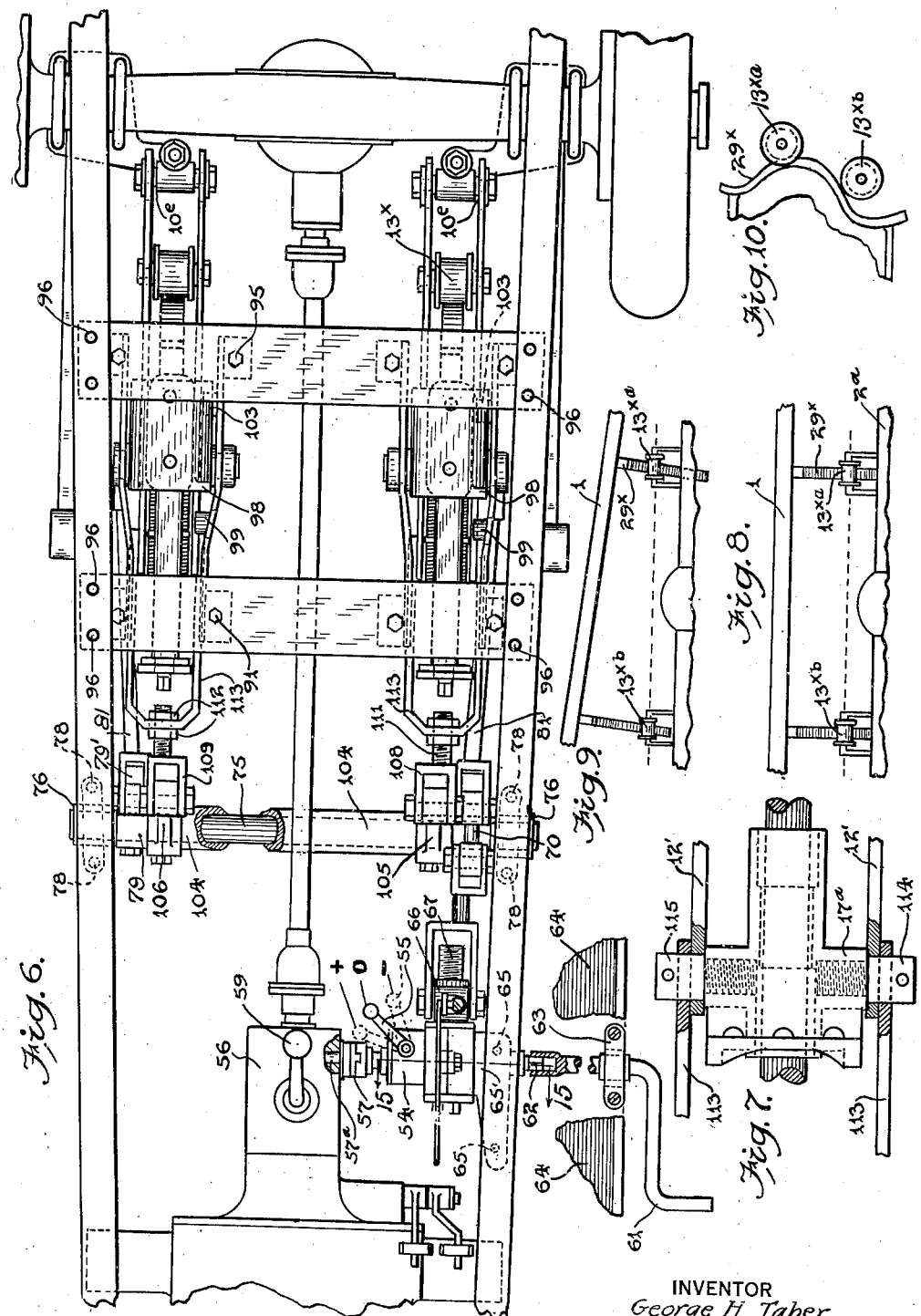

Aug. 28, 1934.  G. H. TABER  1,971,541
MEANS FOR CONTROLLING THE SUPPORTING STRENGTH
OF RESILIENT VEHICLE SUPPORTING MEANS
Filed Jan. 5, 1933  5 Sheets-Sheet 4
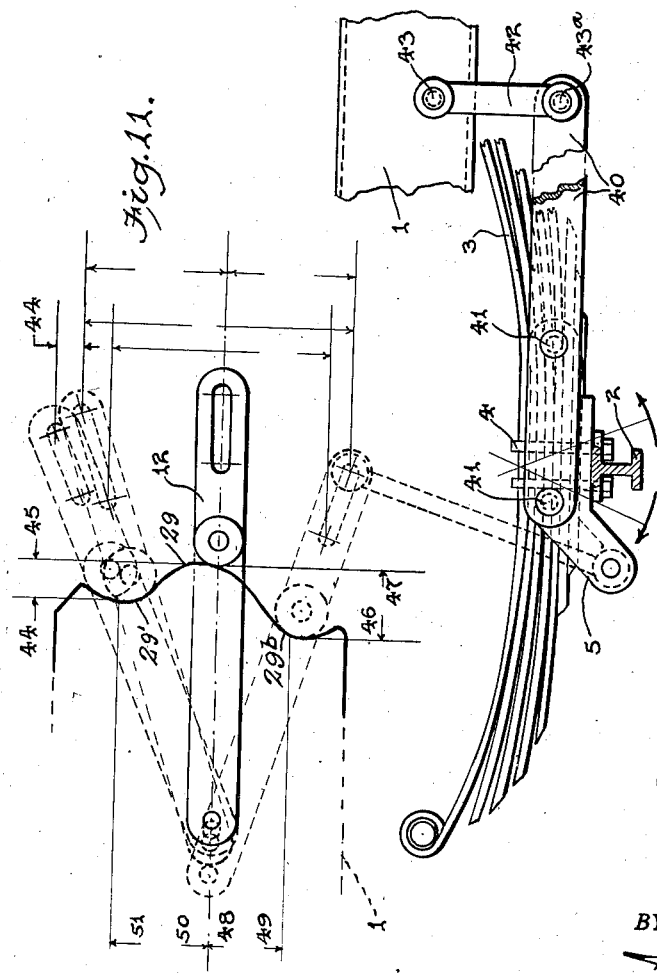
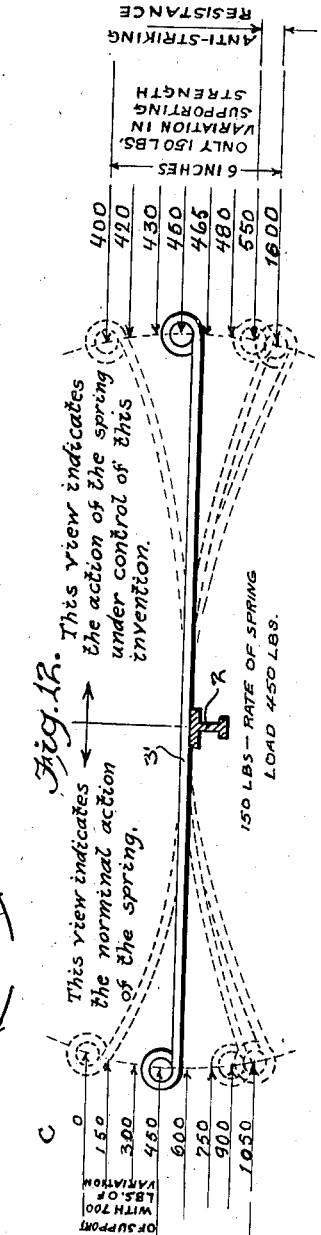
INVENTOR
George H. Taber,
BY
ATTORNEY

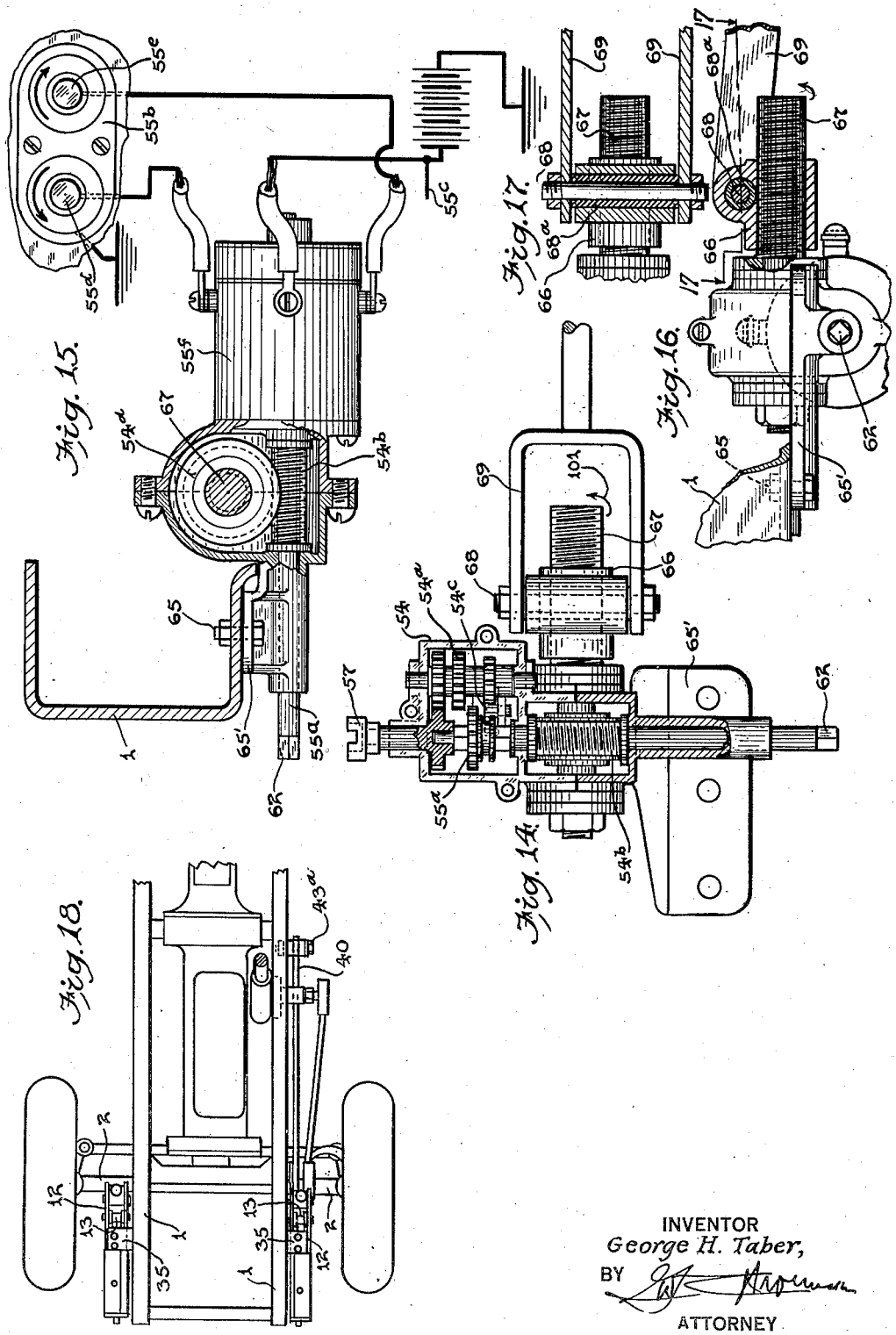

Patented Aug. 28, 1934

1,971,541

UNITED STATES PATENT OFFICE 1,971,541

MEANS FOR CONTROLLING THE SUPPORTING STRENGTH OF RESILIENT VEHICLE SUPPORTING MEANS

George H. Taber, Binghamton, N. Y.

Application January 5, 1933, Serial No. 650,331

63 Claims. (Cl. 267—11)

The invention relates to power driven vehicles and particularly to means for controlling the supporting strength of resilient vehicle supporting springs.

When a vehicle is driven over a roadway having an uneven surface, the vehicle body being resiliently supported by springs on the vehicle running gear, the body is caused to ascend and descend according to the degree of the uneven surface of the roadway. Therefore, and according to the law of gravity, which decrees that a body in a quiescent state of equilibrium will remain relatively motionless or in said state until acted upon by some force, the vehicle spring in this instance acts as a supporting force against the weight or inertia of the vehicle body as it is influenced by gravity. If, as the vehicle is driven over the roadway, the vertical movement of the vehicle body is desired to be reduced to substantially zero of movement, then there must be provided means whereby a desired vertical movement of the running gear wheels and axle relative to the body can be permitted, as the obstructions and depressions of the roadway are encountered, and coincident with such movement a controlling means employing energy must apply its force between and to the vehicle running gear and the vehicle body in such a manner as to prevent the excessive variations in the supporting force of the vehicle spring and thereby reduce the action of the force of gravity. Therefore, by reducing the degree of the forces that control the undesired vehicle body movement which are within the scope of the action of the controlling means, the vehicle body is maintained substantially motionless in respect to vertical movement.

It is well known, in accordance with the law of gravity, that a freely falling body gains speed with time, in other words accelerates as it falls, and also that a body maintained at or along a certain elevated position will remain at and along said elevated position just so long as an equilibrium of forces is maintained which prevents vertical movement thereof but that forthwith upon an upsetting of said equilibrium said body will tend to have that vertical movement incident to the change of forces vertically effective thereupon. In a motor vehicle where the weight of the vehicle body is much in excess of that of the running gear of the vehicle, if an explosive release of force between the two occurs, to-wit if a suddenly or quickly acting force comes into play in a manner to move the running gear from the body, then and in that event as to the body and the running gear thereunder each will tend to move from the other when depressions of the roadway are encountered. The running gear being lighter and assisted by gravity plus the explosive controlling and separating force applied thereto is of material assistance in maintaining substantially motionless the vehicle body in respect to vertical movement. The explosive force applied between the two tends to hold the vehicle body against the influence of gravity and also substantially retards the beginning of downward movement due to gravity and time. This is accounted for by the abundance of power employed in the present invention, which is nearly sufficient to hold the heavy vehicle body suspended seventy-five percent above its normal distance from its running gear. Thus the power of support which is capable almost of holding the heavy vehicle body is explosively applied to the lighter running gear in its entirety, thereby speeding up the movement of the running gear and adding support to the vehicle body against descent on encountering depressions.

When obstructions are encountered, the vehicle spring tends to raise the vehicle body because the inertia of the vehicle body through the medium of the vehicle spring yields to upward movement due to the running gear being forced in the direction of the vehicle body. In the present invention, the aforesaid controlling means must apply forces that tend to raise the running gear up and over the obstruction. In other words, as the running gear moves toward the vehicle body the controlling means releases power in proper degrees so as to assist the axle or the running gear to compress the vehicle spring and thereby prevent the vehicle spring as being a medium by which to apply forces which are sufficient to move the vehicle body from its "at rest" position. The inertia of the vehicle body also assists to make the body immune to vertical movement.

I find that the variation in the supporting strength of the supporting action of the vehicle springs as a result of travel over uneven road surfaces causes rebounding and also that friction in the resilient supporting means of the vehicle causes the vibration developed by the running gear to be transmitted to the body of the vehicle, and therefore I eliminate friction in the resilient suspension and the controlling means as far as it is practical to do so. Having explained the invention relative to increased speed and range of the running gear movement as means to minimize the speed and range of the vehicle body movement, it will now be noted that it is also necessary to provide means whereby the aforesaid controlling means will resiliently and powerfully resist the running gear parts from striking the body frame of the vehicle body and in such a manner that the full strength of the vehicle spring may co-operate with the power of the controlling means for the purpose of preventing striking of the two, and which should be confined to a small zone of the controlling influence so as to prevent "body throw."

It will now be obvious that when the vehicle is driven over an uneven roadway, even though the vehicle body frame be of considerable distance above its normal position, as when and after a culvert of a macadam roadway has been encountered, the weight of the vehicle on the tire treads thereof and the road surface is not much changed due to the aforesaid controlled and permitted movement of the running gear toward and from the vehicle body frame. This fact therefore assures better traction for propelling the vehicle or for braking the vehicle. However, while the vehicle frame is still a considerable distance above its normal position due to passing the aforesaid culvert, the spring or springs of the front axle are consequently forced away from the vehicle frame, the front axle acting as part of the steering means of the vehicle, and due to the force of the controlling means being applied thereto the front axle therefore tends to yield rotationally under the forces of the controlling means and thereby would detrimentally affect the steering of the vehicle were it not for a torque arm provided to resist this undesired action of the steering axle of the vehicle due to the force of the controlling means.

Due to the requirement of the torque arm, my invention adds desirable supporting strength to the vehicle spring in the zone which was heretofore lost or unused. In some vehicles, for instance pleasure vehicles, the majority of the freight or passenger load is carried over the rear springs, and, due to the vehicle springs incident to the present invention being controlled in a manner which permits the running gear to move toward and from the vehicle body frame without permitting too great a variation in the strength of the supporting action of the springs, it is evident that any added load would cause the vehicle body frame to descend much nearer to the running gear axle than would the vehicle body frame if the controlling forces were not applied. Therefore, I adjust my front spring controlling means to a toleration of two passengers, whereas the load carried by the rear springs is so varied that the controlling means must be shifted in such a manner as to require provision for a "load controlling means" which at times makes it necessary to produce power sufficiently equivalent to the added or detracted load for the purpose of shifting the load controlling means. It is common knowledge that in present day motor vehicles, when loaded, the frame settles down too much over the rear axle. This settling destroys the desirable clearance between the axle and the frame of the vehicle body. This load controlling means of my invention permits the load to be carried while maintaining substantially the same clearance between the vehicle frame and its axle, and in the accomplishment of this, the variations in the strength of the supporting action of the vehicle springs are coincidentally controlled. As it requires considerable power to shift the load controlling means, I utilize the energy produced by the vehicle's propelling means for the purpose of moving or shifting the load controlling means so as to relieve the operator of this required exertion. However, I also provide an emergency means to shift the load controlling means should the powered means for shifting the load controlling means accidentally become inoperative. An indicator is visible to the operator so that he may observe the progress or location of the load controlling means when corrections for load conditions are being made.

Having explained the necessary corrective requirements to meet load variations in respect to the vehicle spring which is being controlled against the variation of its supporting action due to the action of the running gear of the vehicle in moving toward or from the vehicle body, it will be evident that if an added weight will cause the frame of the vehicle body to be forced down too near the rear axle of the vehicle, the body of the vehicle is then suspended on the running gear in a super-resilient manner. Therefore, when speeding the vehicle over a straight course, if the steering gear is turned from the straight course, the body of the vehicle tends to follow the straight course, and consequently the body of the vehicle tips toward the outside of the turn as the running gear follows the direction of the steered course, and my correction for this undesirable outward tipping is to provide means whereby the two units of the spring controlling means are so coupled together that they are caused to work in unison with each other and to perform the desired controlling effect of each of the two rear springs so long as the frame of the vehicle is substantially in parallel relationship with the axle of the vehicle, but when the frame of the vehicle becomes out of parallel relationship to the axle of the vehicle, then either one of the two spring controlling means defeats the controlling action of the other; thus a greater degree of the original action of the vehicle spring is regained so as to prevent abnormal tipping which would be permitted by controlling of the vehicle spring against the variation in the strength of the supporting action of the spring, were it not for the aforesaid corrective action.

Therefore, one object of the present invention is to obtain a greater range of resilient supporting power from the common type of supporting springs by producing an added strength to each spring in the zone of the spring action area, which heretofore has not been utilized for resilient support, due to the natural required yielding of the springs before a balanced condition could exist between the strength of each of the vehicle springs and the weight of the vehicle body on each of the aforesaid springs.

A further object of the invention resides in the provision of a motor vehicle including a vehicle frame and a running gear including the usual spring supporting elements between the frame and the gear to movably support the frame on the running gear and permit movements between the frame and the running gear and to provide means for cooperation with the frame and the running gear which will permit the usual movement between the frame and the running gear but will eliminate too great a variation in the strength of the supporting action of each of the vehicle supporting springs incident to movements between the frame and the running gear and in such a manner as to reduce the speed and range of movement of the frame with relation to the running gear as the vehicle travels over uneven road surfaces.

Another object of the invention is to provide means to assist the wheels and the axle of the vehicle in the compression of each of the vehicle springs so that the body of the vehicle may be substantially inert in respect to vertical movement as a result of travel over uneven roadway surfaces and to provide an additional force which thrusts the lighter axle and wheels from the heavier vehicle body into a depression so as to permit the body of the vehicle to remain substantially inert in respect to the vertical movement.

Another object of the invention is to provide a resilient suspension means between the vehicle body frame and the running gear of a power driven vehicle including means whereby to maintain the vehicle body frame substantially inert or motionless against vertical movement as the running gear moves vertically toward and away from the body frame incident to the running gear wheels contacting with uneven surfaces in a roadway.

Another object is to provide ample resilient resistance between the frame and the axle so as to prevent the frame and the axle parts from striking when encountering abnormal obstructions.

A still further object of the invention is to provide a motor vehicle embodying a frame and running gear including the usual springs between the frame and running gear to yieldably support the frame on the running gear, with energy storing means having operative connection with the frame and with the running gear, and permitting the usual yieldable movements between the frame and the running gear but effectively eliminating too great a variation in the strength of the supporting action of each of the usual supporting springs, together with means for resisting stress on the steering axle and to prevent rotational movement of the axle due to the powered action of the energy storing means being effective upon the steering axle.

Another object of the invention resides in the provision of a motor vehicle embodying a frame and a running gear and the usual springs between the frame and the running gear to yieldably support the frame and permit the usual movements between the frame and the running gear with an energy storing means supported on the vehicle and having operative connection with the running gear to automatically release and restore energy and control against variations in the strength of the yieldable supporting action of each of the usual supporting springs under a given load, with means, preferably in the nature of a cam mechanism, associated with the energy storing means and operable in unison therewith, in combination with means whereby the energy storing means and the cam mechanism may be moved to various positions for the accommodation of an added load to the vehicle without destroying the control against variations in the strength of each of the yielding supporting springs and yet maintain a substantially normal clearance between the frame and the running gear of the vehicle, and nearly the same as if no extra load were in the body of the vehicle.

Another object of the invention resides in the provision of a motor vehicle embodying a frame and a running gear and the usual springs between the frame and the running gear to yieldably support the frame and permit the usual movements between the frame and the running gear with an energy storing means supported on the vehicle and having operative connection with the running gear to automatically release and restore energy and control against variations in the strength of the yieldable supporting action of each of the usual supporting springs under a given load, with means, preferably in the nature of a cam mechanism, associated with the energy storing means and operable in unison therewith, in combination with means whereby the energy storing means and the cam mechanism may be moved to various positions simultaneously for the accommodation of an added load to the vehicle without destroying the control against variations in the strength of the yielding supporting action of each of the vehicle springs and yet maintain a substantially normal clearance between the frame and the running gear of the vehicle, with the adjustability of both of the control means and cam mechanism readily operable in unison upon relieving the vehicle of the added load for the purpose of restoring effective spring action of each of the usual vehicle supporting springs and maintaining effective control against variations in the strength of the supporting springs, and thereby maintaining a substantially normal clearance between the frame and the running gear of the vehicle irrespective of light or heavy loads and upon increasing or decreasing the weight of the load.

Another object resides in the provision of means controllable by the operator whereby the power of the vehicle propelling means is utilized to shift the load compensation means to correct ill effects of riding due to too heavy or too light loads, and yet provide a manually operated emergency means to perform the same function when the vehicle is at rest.

Another object of the invention resides in the provision of a motor vehicle embodying a vehicle frame and a running gear including the usual vehicle supporting springs between the frame and the running gear to support the frame on the running gear and permit movements between the frame and the running gear with means associated with the frame and the running gear and operatively connected therewith to permit said movements between the frame and the running gear but eliminate too great a variation of the strength of the supporting action of each of the usual vehicle springs incident to such movements as referred to and thereby reduce the speed and range of movement of the frame with relation to the running gear as the vehicle travels over uneven roads and so long as the frame and the running gear are in their usual parallel relation to each other, with means also included to render said spring controlling means ineffective for the purposes stated when the frame moves too far out of horizontal parallelism with the running gear.

A still further object of the invention is to provide an energy storing mechanism comprising a supporting means in which is removably mounted a rod carrying two spaced members thereon with one of the members slidable toward and away from the other member for the compression and release of springs located between said members, and which are compressed upon forced movement of the slidable member against the springs toward the other member, with such slidable member fastened to maintain the compression of the springs temporarily for subsequent installation purposes.

A still further object is to provide a cam with means attached thereto whereby said cam of a given shape and size may be employed as means to apply controlled energy between the vehicle body member and the running gear of the vehicle so as to control the variations in the supporting strength of the vehicle springs and to assist in the prevention of the striking of the two said members, the attachment to said cam being adjustable whereby a variety of distances between different frames and axles may be brought under the controlling action which involves said cam when said attachment is adjusted for such a purpose.

With the above and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the drawings:

Figure 1 is a fragmentary view of one side of the front portion of a motor vehicle, parts being shown in elevation and parts in section.

Fig. 2 is a transverse sectional view on the line 2—2 of Fig. 1.

Fig. 3 is a horizontal sectional view through one of the front cross heads.

Fig. 4 is a side elevation of one of the rear combined cam mechanisms and energy storing means disposed in normal position, parts being shown in section.

Fig. 5 is a view similar to Fig. 4, illustrating the combined cam mechanism and energy storing means in adjusted position.

Fig. 6 is a top plan view illustrating the rear combined cam mechanisms and energy storing means, the body of the vehicle being removed.

Fig. 7 is a top plan view of one of the cross heads of one of the rear combined cam mechanisms and energy storing means.

Fig. 8 is a diagrammatic illustration, showing that the rollers, which are always in parallel relation to the axle, are in this instance also parallel to the frame, thus controlling against variation of spring supporting strength.

Fig. 9 is a diagrammatic illustration, showing the frame as being out of parallel relation to the axle, thereby causing the rollers to become askewed to the surface of the cam.

Fig. 10 is a diagrammatic illustration, showing the fragmentary view of a cam which is representative of the two rear cams, the higher roller being representative of its assumed position on the lower side of the vehicle when the frame and the axle are not parallel to each other and it is forcefully pressed against the high portion of one of the cam surfaces, the lower roller being represented to show the roller of the cam on the other side of the higher side of the tilted vehicle frame, due to the automatic means, which eliminates the controlling action against the variations of the supporting strength of the vehicle springs as when the frame and the axle become out of parallel to each other, the lower roller thus tending to be held away from the surface of the cam by the interposed means connected between the lower roller and the higher roller so as to restore all possible of the original characteristics of the vehicle spring so as to prevent undue tilt.

Fig. 11 is a diagrammatic view illustrating the throw of the arms and roller bearings of the front cam mechanisms.

Fig. 12 is a chart illustrating on the left hand side the normal action of the usual automobile body supporting springs, while on the right hand side there is indicated the action of the springs under control of the present invention.

Fig. 13 is a horizontal sectional view on the line 13—13 of Fig. 1.

Fig. 13ª is a detail transverse sectional view on the line 13ª—13ª of Fig. 4.

Fig. 14 is a bottom view of the driving mechanism illustrated in Fig. 6 with the cover removed and parts of the casing shown in section.

Fig. 15 is a vertical transverse view, partly in section, of that portion of the mechanism in the region of the line 15—15 of Fig. 6. In this Fig. 15 there is shown the electric motor which is used to perform the same service as that which will be rendered through manual operation of the elements, as illustrated particularly in Fig. 14.

Fig. 16 is a fragmentary view partly in elevation and partly in section, illustrating a portion of the load controlling means.

Fig. 17 is a horizontal sectional view on the line 17—17 of Fig. 16.

Fig. 18 is a top plan view with the vehicle body removed, illustrating the relative location of the controlling means as applied to the forward end of a vehicle having two springs to support the forward end and also showing a top view of the front axle torque arm.

Referring now more particularly to the accompanying drawings, the reference character 1 indicates the frame of the motor vehicle, the character 2 indicating a front axle and 3 the front springs, each secured to the axle by means of the usual clips 4 and the center pin or bolt 4'.

A bracket 5 is secured to the axle adjacent each spring 3 by being interposed between the respective spring 3 and the axle and there held by means of the spring clips 4.

The reference numeral 6 indicates a connecting shank rod disposed adjacent each front spring 3 and each of which is provided at its lower end with a cup part 6', see Figs. 1 and 2, of a ball and socket joint A to receive the ball 6ª of said ball and socket joint. Each ball 6ª is carried on a screw threaded shaft 6ᵇ screwed in a threaded opening in the aforesaid bracket 5. These ball and socket joints may be of any suitable respective character so long as suitable ball and socket joints are formed between the connecting shank rods 6 and the brackets 5. The cap screw 6ᶜ is in threaded engagement with the interior of 6ª and is used as means to press the washers on each side of the spring 6ᵈ so as to act as a "take-up" for looseness that might develop and thereby prevent noise.

Threaded nuts 7 and 8 have working fit on the upper screw threaded ends of each of the connecting shank rods 6 for the purpose of providing for minute adjustments of a connection of the connecting shank rods 6 with other parts. For instance, there is a sleeve-like member 9 mounted at the upper end of each of the connecting shank rods 6 and which is locked in position on the respective connecting rod by the respective nuts 7 and 8. Arms 12 connect with respective shank rods 6 by means of a bolt 10 which passes through the elongated slots 11 of the arms 12 and through the respective members 9, providing a knee joint bearing between the arms and shanks. The bolts 10 can be loosened so that the members 9 may be shifted in the slots 11 of the arms 12. The bolt 10 in conjunction with a sleeve 10$^d$ and washers may be tightened so as to securely lock the bolt against undesired movement in the slots 11 and at the same time permit free swinging action of the members 9 of the knee joint. By having the length of the sleeve 10$^d$ longer than its bearing surface in the part 9, a clearance space is provided at 10$^e$, thus when the nuts 10$^a$ are tightened the washers and the sleeve are clamped tightly together so as to make the sleeve and the interior of the part 9 act as ample bearing surface.

It is desirable to have the "femur" bars or arms 12 assume a substantially horizontal position or in horizontal alignment when they are at rest or in normal position, with the guiding means to which the other ends of these arms are pivotally connected, so as to reduce friction that would result from not being parallel thereto. These arms 12 each consist of a pair of members and each pair of arm members 12 carries a roller 13, the rollers 13 being each mounted on a suitable axle providing an axis at 14 in said arms 12 for a purpose presently explained.

Associated with each set of shank rods 6 and arms 12 with their rollers 13 is a cam member 22, each having a cam surface 29 with which the respective rollers 13 cooperate, and these cam members 22 are supported on the vehicle, as will be later explained, and in cooperative alignment with the aforesaid arms 12. An energy storing means, collectively referred to as B, cooperates with each cam member 22, acting in unison therewith, as will also be later explained. To these ends, the reference character 17 indicates cross head members, each having bushings 18 and 19 (see Fig. 3). These cross head members have their bushings 18 and 19 slidably embracing the respective guide shaft or rods 20 of the respective combined cam mechanism and energy storing means above referred to, and due to spring pressure, incident to the energy storing mechanism, the arms 12 are effectively held to a working connection with the "hip" pivot pins 15 and 16 fitting tightly and pressed into the respective cross head members 17, the said pins 15 and 16 each having an annular groove to receive the outer ends of the parallel members constituting the arms 12, as shown in Fig. 3. These pins 15 and 16 and the roller bearings 13 and their axes are constructed in a common manner for lubricating purposes.

The guide shafts 20 are each carried by the respective cams. For instance, each cross head member 17 is supported on the respective guide shaft or rod 20, as stated, and each cam member 22 is substantially U-shaped and each includes legs 22' and 22$^b$. To the outer ends of these legs 22' and 22$^b$ a plate 21 is secured by means of suitable fastenings 86. Each guide rod 20 is supported at its outer end in a central bearing 21' in the plate 21 carried by said legs of the respective cam members 22 and at its inner end it has threaded engagement at 20' with the respective cam member 22. This screw threaded connection permits of changes in the pressure of the energizing springs 23 of the energy storing means B mounted between the legs 22' and 22$^b$ of each cam member, and in embracing relation with the respective guide rod 20. These energizing springs 23 are centered as to location by spaced knobs 24 on a plate portion 17' of the cross head member 17 to which the particular plate portion 17' corresponds. Each cross head member 17 is slidably mounted on its corresponding guide rod 20. These knobs are of a size small enough to permit a spring being inserted inside of the springs 23, if desired.

Thus it is possible to greatly change the strength of energy of the energy storing means B under consideration by the addition of springs or the removal of springs, as should be understood. It is advantageous to have many springs, so that if one spring becomes broken the efficiency of the energy storing means B would not be seriously impaired. These springs forming the separate energy storing means B should be as long as possible, and for that reason I preferably place sets of springs with each set including two springs arranged end to end, and to prevent buckling when the springs are under pressure, I employ positioning or guiding washers 25 slidable on studs 26 and shaped so as to hold the springs centrally with relation to the respective guiding studs 26 which the springs encircle and which project inwardly from a plate 27 on each guide rod 20. As previously stated, it is noted that there is room for a smaller diameter spring to be inserted within the large one and also encircle the respective studs 26. These guide studs 26 are anchored to the respective members or cross plates 27 in any suitable manner, by way of riveting or threading to engagement with the member 27, there being a working clearance existing within the bearing boss of the member 27 between the said member and the respective guide rod 20. A thrust collar 28 is pinned or otherwise secured to each guide shaft 20. Each plate 27 is spring pressed against the respective collar 28, due to the energy compressed into the springs 23, and held so by means of the aforesaid arms 12 and the roller 13, by the contact with the cam face 29 of the cam member 22.

In order to confine the stored energy so that the device may easily be installed to its proper position on the vehicle and properly connected thereto, I provide holes 30 in each guide shaft or rod 20 through which a pin 30' is inserted after the springs 23 are compressed by an arbor press, so that the energy is confined while the energy storing devices are being installed on the vehicle. The pins 30' may be inserted in either of a plurality of two or more of the pin holes 30 of the respective shafts, thereby holding the member 17 at a determined position to expedite installation.

Each guide rod 20 is also provided with a stop pin 31 so as to prevent the guide rod from being unthreaded too far and to prevent the springs 23 from bottoming. Each guide rod 20 is also provided at its other end with a wrench head 32. The aforesaid collars 28 are inclined to turn the plate 27 with them when the shafts 20 are being turned for adjustment, and for this reason the plates 27 are each provided with a guiding means 33 which straddles a portion of the lower leg 22$^b$ of the respective cam member 22. It will be understood that the cross head members 17 are guided only by the respective rods 20 and not by any portion of the cam member 22. This arrangement permits the cross head members 17 to have circular freedom in their movement along the rod 20. However, the cross head members 17 are held always in connection with the respective shank rod 6 by means of the respective knee joint pin or bolt 10, and the energetic force exerted between the hip joints 15 and the shafts or axes 14 of the respective rollers 13. The springs 23 next to the cross head members 17 yield with the latter when this circular freedom is required.

Brackets or hangers 35 are illustrated particularly in Figs. 1 and 2, and each hanger or bracket is secured to the frame 1 by any suitable means, as for instance, by bolts 37, there being but one bolt shown so as not to confuse the drawings. Each bracket or hanger 35 has a laterally extending upper end and this laterally extending upper end of each bracket or hanger 35 is secured in any suitable manner to the head portion 34 of the respective cam member 22, preferably by means of suitable bolts 36, whereby to effectively support the cam members 22 and consequently the energy storing means B carried thereby.

A sheet metal cover 38, made in two sections as shown, may be employed to enclose the space about legs 22' and 22ª of the cam 22, and it will be noted that the ends of one of these sections are wrapped one over the other on the respective cam member 22 (see Figs. 1 and 2) and secured thereto by means of screws or other suitable fastenings 39.

When a maximum of clearance exists between the vehicle frame and the front axle, the axle is insecurely held in proper position by the front vehicle springs 3. This is due to the mechanical action of this method, adding greatly to the support of the vehicle body due to the release of the energy of the controlling devices B, and is illustrated in Fig. 11. In other words, the vehicle axle is hanging to a full open spring. This condition, therefore, means unreliable steering so far as the now "floating" axle is concerned. Therefore, on one of the aforesaid brackets 5 provision is made to secure the arm 40 in a rigid manner by means of rivets 41, the rear end of the arm 40 being connected to the frame 1, as shown in Fig. 12, by a suitable shackle link 42 which swings on the bolt 43 which is anchored to the frame 1. The lower end of the shackle link 42 is workably connected to the arm 40 by means of a stud 43ª anchored in the arm 40. With the employment of this arm 40 rigidly connected at its forward end to the axle and swingingly connected to the frame 1 at its rear end, the steering axle and its spindle bolt are held in more proper position with relation to the steering gear, even though the maximum of clearance between the axle and the frame exists. Arm 40 being permitted to swing at the shackle link 42 does not interfere with the forward or rearward movement of the front axle as the result of the action of the front springs 3.

In Fig. 12 there is indicated a chart showing a comparison of the variation of the stored or released energy of a vehicle spring (represented in this instance by an eye or main leaf of a spring).

In Fig. 12 the uncontrolled spring 3' shows a variation of resilient supporting strength from 0 to 1050 pounds of possible stored energy, as indicated at C, and this is the natural characteristic of all springs employed in motor vehicles. The inertia of the vehicle body is not sufficient to resist the compounded forces as stored in its multiple springs, and therefore, the body is caused to be thrust upward at speeds in ratio to the force applied to the body by the springs. This abnormal release of stored energy applied to the body actually forces the body far upward and greatly past the normal balanced position of the heavy body in its relation to the strength of the spring. The inertia of the body being set in motion actually travels beyond the limit of the spring force, whereby the action of gravity and the inertia of the body cause it to begin to function as a pendulum and the speed of this pendulum action is determined by the weight of the body and the strength of the springs. The front springs being shorter between the eye bolts than the rear springs, they react more viciously than do the rear springs, this being due to a greater variation in the strength of the front springs than that which occurs in the rear springs for a given distance. The rear springs being longer than the front springs, they will throw the body further than will the shorter front springs. Again referring to the diagram in Fig. 12, it will be noted that the rate of increase is 150 pounds per inch from 0. The imaginary or assumed load supported by the illustrated spring is 450 pounds, and if the wheel of the vehicle meets a depression of the roadway of three inches, the energized control quickly forces the tire of the wheel down into the three inch level and as there still remains a supporting strength of 400 pounds, the body of the vehicle being heavier than the wheeled running gear remains nearly or approximately relatively motionless in so far as vertical movement thereof is involved due to the "explosive separation" action occurring between the body and the lighter running gear, and there is no sudden "drop" of the body. In the event of the wheels of the running gear contacting with a three inch normal obstruction, the wheels are moved so quickly toward the frame that the inertia of the body again remains substantially motionless in respect to the vertical movement, and this is due to the fact that the variation in the strength of the spring has only been increased 100 pounds even though the axle was forced to a distance of three inches nearer to the frame. Had the obstruction been only two inches, the variation would have been only 30 pounds. It is obvious that the contour of the cam member 22 can be developed for any variation of spring rate strength at the various degrees within the scope of its range.

Still making reference to Fig. 12, when the uncontrolled spring encounters an abnormal obstruction, the vehicle frame is liable to strike the axle and the body of the vehicle is thrown upward violently. The diagram (Fig. 12) shows the cam arranged to resist this striking. The area of this anti-striking zone is so short or limited that a "body throw" cannot result. The striking resistance is resilient and according to the diagram shows 1600 pounds or resistance provided for this accomplishment which is indicated by the numeral 44 in Fig. 11. The 1600 pounds of striking resistance is made up of the maximum strength of the spring, which is 1050 pounds, plus the resistant energy of the controlling or energy storing means which is aproximately 550 or more pounds, the sum total being 1600 pounds. With this reduction in the variation of the strength of the vehicle spring, adequate means must be provided for making proper relationships as to positioning of the roller 13 in a proper place with respect to the cam surface 29 of the cam member 22 so as to secure the proper reaction. For example, if the roller 13 were too low on the cam surface 29 the body would be held too high and the controlling power of the controlling or energy storing means would not prevent the springs of the vehicle from thrusting the body up too quickly and too far, and riding would be quite rigid because double strength of spring would be supporting the body. Therefore, the adjusting nut 8 is loosened and the nut 7 is adjusted upward and thus the roller 13 is moved to a higher position on the cam. This adjustment is used so that the spring rate control corresponds to the diagram of Fig. 12, and the power adjustment means of the guide rod 20 may also be adjusted at such times, and if the power of the stored energy is too great some of the springs 23 may be removed or some added, or vice versa.

Another condition that sometimes presents itself is that of a weakened spring due to improper tempering. In common words that spring has "settled" and in such an event bolt 10 of Fig. 1 is loosened and then tightened after part 9 has been moved toward the cam surface a distance which will compensate for the settled spring. In other words, this adjustment is to permit the cam action to perform all of its various degrees of function in controlling the settled spring as required. A shorter range of cam action is thereby provided which compensates for the settled spring.

In Fig. 11 in conjunction with Fig. 1 it is noted that the depression 29' in the cam surface 29 above normal zone, which is indicated by the center line through the femur bar 12 in Fig. 11, is not a deep one, as the arrows 44—45 indicate, as is the depression 29$^b$ in the cam surface 29 below the same line, as is indicated by the arrows 46—47. Further attention is called to the fact that the deepest part of the lower depression is nearer the central line of the femur bar as indicated by the arrows 48—49 of the depression 29' of the cam surface, which is above the center line through the femur bar, as is indicated by the arrows 50—51. This formation of cam surface produces very favorable results and the controlled variation of the strength of the vehicle spring is very closely related to the comparison of the chart in Fig. 12.

In carrying out my invention, I provide for the control against variations in the strength of the yieldable supporting action of the front and rear vehicle springs under a given load, and therefore, in addition to the cam devices and energy storing means hereinbefore described, I employ another set of such devices and means at the rear of the vehicle in association with the usual rear supporting springs of motor vehicles. Briefly, the rear cams are shown particularly in Figs. 4 and 5 at 22$^x$, and are similar to the front cams 22, save for a slight difference in the formation of the cam surfaces 29$^x$. These rear cam devices have cooperating arms 12' similar to the aforesaid arms 12 and they are connected, as later explained, to cross heads 17$^a$ (Fig. 7), to hip joint pivot pins 114 and 115, and at the rear ends have slotted bolt connections at 12$^a$ with sleeves 9' to form a knee joint, as at the front axle, as will be explained. In Figs. 4 and 5 the rear shank rods are indicated at 6' pivoted at 6$^e$ on plates 6$^f$ by which the rear shank rods are secured to the rear axle by means of clips 4' which secure the rear springs to the rear axle 2'.

With the above explanation of the manner in which I control the rate of action of the vehicle springs, it must therefore be evident now that if any excessive load enter the vehicle body, then the frame of the vehicle body would be forced down too close to the axle of the vehicle. In pleasure vehicles the greatest changes of loads occur over the rear wheels, in view of which, I provide means whereby the power of the vehicle propelling means is used to shift a mechanism which will quickly compensate for the added load and at the same time restore the normal clearance between the rear axle and the kick-up of the vehicle frame as indicated by the arrows 52—53 of Figs. 4 and 5. In Figs. 6 and 14 a gear set 54 is shown. A hand lever 55 is connected to the gear set and may be moved to neutral position indicated by the letter O. The lever 55 may have two other directions of movement for the purpose of compensating for added or detracted load. One direction of movement is designated by the plus sign, and the other direction is designated by the minus sign. Between the transmission 56 and the gear set 54 is a universal coupling 57 to compensate for frame strains. From the universal coupling 57 a shaft 57$^a$ enters the transmission 56 and is in geared engagement with the countershaft of the common transmission, thereby making it possible to utilize the produced energy of the motor for the purpose of tilting or shifting the cams under load to compensate for an added load, as will be explained later on. In this hook-up of the countershaft of the transmission, there may be produced a powered means for shifting the load controlling means, even though the car or vehicle is in motion. This is accomplished by placing the transmission gear shift lever 59 into neutral position. While the clutch between the motor and the transmission is still disengaged the lever 55 of the gear set 54 is then set to compensate for added or detracted load. The clutch of the transmission 56 is then slowly engaged for the purpose of passing energy through the gear set 54 for riding correction due to load or lack of load discrepancies. An indicator unit 60 is observed by the operator while the powered means of shifting the controlling means is in service. When the indicator registers a condition believed to be satisfactory by the operator, the operator again releases the clutch to the transmission 56 and places lever 55 of the gear set 54 in its neutral position. Fig. 14 shows the sliding gear 55$^a$ in its neutral position. When gear 55$^a$ is moved so as to engage with the gear 54$^a$ then the worm 54$^b$ may move in one direction. When the gear 55$^a$ is moved to engage with the reverse idler gear 54$^c$ then the worm 54$^b$ turns in the opposite direction. This worm 54$^b$ turns its worm gear wheel 54$^d$, see Figs. 14 and 15, thereby turning the screw member 67 of the load controlling means, which moves the nut member 66 so as to shift the position of the cams.

In Fig. 15 is shown another way I have of utilizing the energy as developed by the motor or propelling means, that is, by providing an electric motor 55$^f$ similar to a common starting motor. This electric motor also turns the worm 54$^b$ of the worm gearing in either of two directions, and it has the commutator brushes arranged so one of them is electrically energized. The electric motor 55$^f$ and a control switch 55$^b$ are connected in a common battery circuit, of which the battery is charged through the medium of a generator by the energy of the propelling means, and through the medium of the wire 55$^c$ which is in the generator circuit (not shown). If it is desired that the threaded member 67 turn in one direction so as to shift the load controlling means, then the switch button 55$^d$ is pressed and when the threaded member is to be turned in the opposite direction the switch button 55$^e$ is pressed. Either of these two directions of rotation of the motor armature and the worm 54$^b$ are made possible by providing two brush holders for the commutator of the armature, which reverse the direction of rotation of the armature and parts carried therewith, by the procedure as followed in the common practice of reversing the direction of the armature rotation. The armature shaft extension 55ᵃ is squared at 62, so that in an emergency the crank 61 can be used to shift the load controlling means.

The emergency and manually operated crank lever indicated at 61 in Fig. 6 has a squared socket for engagement with the squared end of an extension shaft 62 of the gear set 54. A bracket bearing 63 supports the crank lever 61 and is connected with said shaft extension 62 and it is anchored to the vehicle running board 64. The gear set 54 is supported on the frame 1 by means of a bracket 65' secured to the frame by means of bolts 65—65, and the graduations of the indicator 60 can be indicative of the number of passengers in a vehicle. For instance, one hundred fifty pounds may be considered as the average weight per person. Should this method of spring control be put in service with a commercial vehicle, then the graduations would have direct reference to weights. In any event, the indicator 60 is disposed anywhere on the vehicle for convenient observation by the operator.

The clearance between the rear axle and the frame is greater than the clearance between the front axle and the frame. The reason for this has evidently been due to the fact that the load weights vary more over the rear axle than over the front axle, and therefore, it will be noticed that the shape of my rear control cams differs slightly from that of my front control cams.

In the common rear spring construction the load forces the frame of the vehicle too near to the rear axle for the proper working clearance between these two parts.

In Figs. 4, 5, 6 and 14, I illustrate my load controlling method. For instance, there is an interiorly threaded sleeve or nut-like member 66 which has threaded working fit on the relatively short exteriorly threaded shaft 67. This shaft 67 has an operative connection with the gear set 54 or the electric motor 55ƒ as the case may be whereby the sleeve 66 is adapted to move fore and aft on the shaft 67 as either by means of the crank 61 or by the energy of the motor. The sleeve 66 is provided with a bearing and a pin or bolt 68 whereby to pivotally connect a rod 69 with one arm of a double armed crank lever 70 by means of the pin or bolt 72. This double armed crank lever 70 is secured by a key 73 and by a clamping bolt 74 to one end of a rocker shaft 75 which is journaled in bearings 76—76 on the frame 1. These bearings 76—76 are fastened to the frame 1 by means of bolts 78 or in any other suitable manner. A sleeve 79 is fastened to the other end of the rocker shaft 75 in the same manner as is the double armed crank lever 70, and this sleeve 79 has an arm 79'.

A connecting arm 81 is pivotally connected to the rear arm of the double armed crank lever 70 by means of a bolt 80. This connecting member 81 is also connected by a bolt 84 mounted in a boss or hub 83 on the under side of one of the rear cam members 22ˣ.

A U-shaped member 87, serving as a hanger and shown more or less in detail in Fig. 13ᵃ, is secured by means of cap screws 36ˣ to the cam member 22ˣ. This inverted U-shaped hanger 87 has stud bearings 88 which have working engagement in suitable bearings in the side members 89 of the hanger. These side members are in bolted engagement at their forward ends with the cross member 90 by means of the bolts 91, the cross member 90 being bolted to the frame 1. The rear ends of the side members 89 are provided with eyes for the bolt 92, whereby an adapter 93 may be employed to compensate for the variation of distances or the angle at which the cross member 94 must be secured to the frame 1. Due to the "kick-up" of the frame 1, the adapter connection 93 is bolted to the frame 1 through the cross piece 90 through the bolt 95. Fig. 6 shows the location of the bolts 91 and 95 at the points 96—96 in Fig. 6.

Having provided this construction, it is obvious that the rear cam member 22ˣ can be adjusted by the means provided so as to be in either extreme setting as illustrated in Figs. 4 and 5, or other intermediate positions therebetween.

It will now be apparent that if the crank 61 is turned in the direction of the arrow 97 or if through other instrumentalities, as, for instance, the energy which is produced by the propelling means of the vehicle, the threaded member 67 is turned in the direction of the arrow 101, the cam members 22ˣ are moved on their pivots 88 and there is a consequent adjustment provided for varying loads. The maximum number of turns on the sleeve 67 may be controlled by lug 98, formed on the inverted U member contacting with another lug 99 formed on the side member 89, these lugs acting as stops to limit the movements.

Should the crank arm 61 be turned in the direction of the arrow 97ᵃ after it has been turned in the direction of the arrow 97, then such turning is limited by the stops resulting from the edge of the U-shaped member at 102 making contact with a lug 103 which is formed on the side member 89.

The roller bearings 13ˣ in Fig. 5 are a considerable distance below the high point of the cam faces 29ˣ of the cam members 22ˣ due to the stored energy and the roller bearings and other component parts. By shifting the cam members 22ˣ to the position shown in Fig. 5, the roller being under proper pressure against the cam faces causes the frame of the vehicle to be resiliently raised to the original clearance between the axle and itself, as indicated by the arrows diverging from the numerals 52 and 53 of Figs. 4 and 5.

If the weight of the vehicle body is 400% in pounds greater than is the variation or change in the strength of the resilient supporting means when measured in pounds, then the inertia of the body weight, due to the center of gravity, tends to follow a straight course, the running gear, due to the steering traction, having changed its course. In other words, the vehicle body tips to the outer side of the curve to a considerable degree. Consequently, I have made it possible, for my method of spring rate control to automatically make this needed correction, providing thereby an automatic spring rate control eliminator. In Figs. 4, 5 and 6, there is shown a tubular member 104 which is mounted on the aforesaid rocker shaft 75 and is adapted to have an oscillatory or swinging movement on the rocker shaft 75. On this oscillating tube 104 near each end thereof, are crank arms 105—106, which are keyed to and also clamped to the tube 104 by means of bolts 107 coacting with a clamp associated with each of the arms 105—106. Connector ends and rods 108 and 109 in the nature of connecting members are attached at their ends to the respective crank arms 105 and 106, by means of a pin or bolt 110 and a sleeve, in a manner much like that shown in Figs. 13 or 17. The other ends of the connecting members 108—109 each have a threaded portion 111, and a pair of nuts 112 have a working fit with each of the connecting members 108 and 109, which are employed for adjusting means after the vehicle body has been found to be parallel to the vehicle axle. The nuts 112 hold the straddle yoke 113 tight to the members 108 and 109. Each yoke 113 straddles portions of the rear controlling means in horizontal alignment with the respective rear hip joint pivot pins 114 and 115, which are in threaded engagement with the members 17ª, as shown in detail in Fig. 7. These rear "hip" joint pivot pins 114 and 115 are carried in the rear cross heads 17ª and the forward ends of the rear arms 12' are connected thereto (Fig. 7), the arms 12' each carrying a roller as 13ˣᵃ or 13ˣᵇ and having slotted bolt connection at 12ª with the sleeve 9' adjustable between nuts 7' and 8' on the screw threaded rods 6' secured to the rear springs 3ª by the clips 4' which secure the rear springs to the rear axle 2'. The same adjustment for knee joint connection between the rear arms 12' and the shank rods 6' is afforded as between the forward arms 12 and the front shank rods 6.

In Fig. 8 the diagram shows the frame 1 in parallel relation to the rear axle, and as long as these two members are parallel to each other the spring rate control is effective in its controlling function.

However, when the frame 1 or the axles are removed from parallel relation, as shown in Fig. 9, then the mechanism involving the tubular member 104 and its arms 105 and 106 automatically defeat the controlling effect, as shown in Fig. 10, wherein the roller as 13ˣᵃ is prevented from performing its controlling action with the cam surface 29ˣ by being away from said surface by its coacting roller 13ˣᵇ of the opposite cam mechanism of the two energized controlling means. The rollers also become askew to the cam when the frame and the axle become out of parallel relation to each other and thereby cause an added friction which is desirable at this time to defeat the rate controlling effect. This method of correcting the tip of the vehicle body when turning quickly is only shown as installed in the rear of the vehicle, but it can be used with the front springs in much the same manner but more closely coupled, if or when desirable; but I find it best to stabilize the vehicle body against outward tip from the rear, because the rear springs are further apart as anchored to the axle. The front end of the vehicle being super-resiliently suspended and the rear end of the vehicle guarding against outward tip provides means whereby the frame of the vehicle is substantially free from undue strains or twists as the vehicle running gear is being driven over oblique obstructions or depressions. In other words, it might be said that the four wheeled running gear acts as a three wheeled running gear so far as strains or twists to the vehicle frame are concerned.

It will be understood from the foregoing, and in the claims appended hereto, and in which latter particular reference is made to movements between the body frame and the running gear that I am referring to such movements as those which are permitted or which are incident to the use of the usual resilient supporting means or supporting means similar thereto and arranged between the body frame and the running gear and which permit of movements of both the body frame and the running gear toward and away from each other, and which, by means employed by me, and operatively associated with the vehicle parts including the usual resilient supporting means or resilient supporting means similar thereto, I am enabled to prevent the "explosive" forces which cause rapid movements of the body frame and running gear toward and away from each other by maintaining the body frame substantially inert or motionless as regards vertical movement as when caused by the running gear as it moves at high speed vertically toward and away from the body frame incident to uneven roadways.

What is claimed is:

1. The combination with a vehicle frame and a running gear including springs between the frame and the running gear to support the frame on said running gear and permit movements between the frame and running gear, of devices mounted on the vehicle and having energy stored therein, and a cam device associated with each spring to release and store such energy, said cam devices having cam surfaces including a substantially central high point and including a depression above said high point and also including a depression below said high point, the deepest part of said upper depressions being of less depth than the deepest point of said lower depressions, and further away from the high point than the distance of the deepest part of the lower depressions from said high point, the curvatures of the depressions from the high point of each of said cams to the opposite depressions being different, an arm pivoted to each energy storing device and operated thereby, a cam roller carried by each of said arm to travel over the cam surfaces of the cam devices, a connecting means between each arm and the running gear whereby energy is released or stored in said energy storing devices to eliminate undue variations in the strength of the supporting action of said vehicle springs incident to the said movements between the frame and the running gear to thereby maintain the body frame substantially motionless with respect to vertical displacement due to the cam rollers traveling over said cam surfaces incident to said relative movements between the frame and running gear during travel of the running gear over uneven road surfaces.

2. The combination with a vehicle frame and a running gear including a spring between the frame and the running gear to support the frame on said running gear and permit movements between the frame and the running gear, of a combined energy storing mechanism and a cam device, a rod carried by said combined energy storing mechanism and cam device and having a threaded portion having working fit in a threaded opening in said combined energy storing mechanism and cam device for power storage adjustment purposes, spaced plates mounted on said rod, one of said plates having slidable movement on said rod, energy storing springs supported and compressible between said plates, means to limit the adjustment of the rod to govern the amount of energy to be stored in said energy storing springs, said cam device being adapted for releasing the energy of said springs and for restoring energy thereto, including cam surfaces and a pair of arms pivotally connected to the aforesaid slidable plate and a roller carried by said pair of arms and spring-pressed against said cam surfaces by said energy storing springs, and means connected to said pair of arms beyond said cam roller and connected to the running gear whereby to move said slidable plate on said rod in one direction to release the stored energy in said springs in accordance with the position of the cam roller with relation to the cam surfaces of the cam device and to shift said slidable plate in the opposite direction in accordance with position of the cam roller with relation to said cam surfaces to compress the energy storing springs and thereby release and restore the energy in said springs and consequently reduce the variation in the strength of the supporting action of the vehicle spring incident to the relative movements of the vehicle frame and its running gear to thereby control vertical movement of the frame with relation to the running gear upon release or restorage of the energy of the energy storing means as the vehicle travels over rough surfaces.

3. The combination with a vehicle frame and a running gear including a spring between the vehicle frame and the running gear to support the frame on said running gear and permit movements between the frame and the running gear, of an energy storing mechanism mounted on the frame, a cam device having operative connection with the energy storing mechanism and including cam surfaces and a cam roller, the energy storing mechanism and the cam device being coupled relatively close together with the cam surface interposed between the energy storing mechanism and the cam roller, and an operative connection between the cam device and the running gear of the vehicle.

4. The combination with a vehicle frame and a running gear including a spring between the frame and the running gear to support the frame on the running gear and permit movements between the frame and the running gear, of an energy storing means having connection with said frame and including a movable member, a cam device including cam surfaces, an arm and a cam roller on the arm for cooperation with the cam surfaces, said arm being pivotally connected at one end to said movable member of the energy storage means, said cam roller acting on said cam surfaces as a fulcrum for said arm and said arm at its outer end having an elongated slot therein, and a connecting element having one end adjustably mounted in said slot of the arm with its opposite end connected to the running gear whereby to provide for an adjustable connection of said connecting element with said arm and to permit of the use of a cam surface of given character irrespective of different distances between the frame and the running gear so as to permit a controlling action through the medium of said cam surfaces of said different distances without changing the cam or altering the contour of the cam surface irrespective of any adjustment made.

5. The combination with a vehicle frame and a running gear including oppositely disposed vehicle springs between the frame and the running gear to support the frame on the running gear and permit movements between the frame and the running gear, of spaced means constructed and arranged and operatively connected between the frame and the running gear at opposite sides thereof permitting said movements but eliminating too great a variation in the strength of the supporting action of the vehicle springs incident to such movements to maintain the body frame substantially motionless with respect to vertical movement of the frame with relation to the running gear as the vehicle travels over uneven roads so long as the frame and axle are in parallel relation to each other during said movements, and means whereby to render the aforesaid spaced controlling means ineffective when the frame moves out of substantially horizontal parallelism with the running gear.

6. The combination with a vehicle frame and a running gear including oppositely disposed vehicle springs between the frame and the running gear to support the frame on the running gear and permit movements between the frame and the running gear, of spaced means constructed and arranged and operatively connected between the frame and the running gear at opposite sides thereof permitting said movements but eliminating too great a variation in the strength of the supporting action of the vehicle springs incident to such movements to thereby reduce the speed and range of movement of the frame with relation to the running gear as it travels over uneven roads so long as the frame and axle are in substantially parallel relation to each other during said movements, a rocker shaft mounted on the frame, and connections between said spaced means and said rocker shaft whereby to render said spaced means ineffective upon operation of the rocker shaft for the purposes aforesaid if the frame moves out of horizontal parallel relation to the running gear.

7. An energy storing mechanism comprising a supporting means, a rod mounted in said supporting means and having spaced apertures therein, two spaced members supported on said rod and one of said members being slidable toward and away from the other member, springs located between said members and which are compressed upon forced movement of said slidable member against the springs toward the other of said members, and a fastening removably insertable in one of said apertures of the rod subsequent to the desired compression of the springs, as aforesaid, so as to maintain the compression of the springs temporarily for subsequent installation purposes in the supporting means.

8. An energy storing mechanism comprising a supporting means, a rod mounted in said supporting means, two spaced members supported on said rod and one of said members being slidable toward and away from the other member, springs located between said members and which are compressed upon forced movement of said slidable member against the springs toward the other of said members, and removable means for coaction with said rod for action against said movable member when the springs are compressed so as to maintain the compression of the springs temporarily for subsequent installation purposes in the supporting means.

9. The combination with a vehicle frame and a running gear including springs between the frame and the running gear to yieldably support the frame and permit movements between the frame and the running gear, of energy storing means supported on said frame and having connection with axles of the running gear to automatically release and restore energy for the control against variations in the strength of the yieldable supporting action of said vehicle springs under a given load, cam mechanisms associated with the energy storing means and operatively connected with the running gear and adapted to control the energy storing means, said energy storing means and the cam mechanisms being mounted for movement in unison, and means whereby the energy storing means and the cam devices may be moved to various positions for the accommodation of an added load to the vehicle without destroying the control against variations in the strength of the yielding supporting action of the vehicle springs and yet maintain a substantially normal clearance between the frame and the running gear of the vehicle.

10. The combination with a vehicle frame and a running gear including springs between the frame and the running gear to yieldably support the frame and permit movements between the frame and the running gear, of an energy storing means supported on said frame and having connection with an axle of the running gear to automatically release and restore energy for the control against variations in the strength of the yieldable supporting action of said vehicle springs under a given load, cam mechanisms associated with the energy storing means and operatively connected with the running gear and adapted to control the energy storing means, said energy storing means and the cam mechanisms being mounted for movement in unison, means operatively connected with the propelling means of the vehicle for actuation while the vehicle is in motion to utilize the energy of the propelling means of the vehicle to move the energy storing means and the cam devices in unison to various positions for the accommodation of an added or removed load to or from the vehicle without destroying the effect of control by the energy storing means against variations in the strength of the yielding supporting action of the vehicle springs and yet maintain a substantially normal clearance between the frame and the running gear of the vehicle.

11. The combination with a vehicle frame and a running gear including springs between the frame and the running gear to yieldably support the frame and permit movements between the frame and the running gear, of an energy storing means supported on said frame and having connection with an axle of the running gear to automatically release and restore energy for the control against variations in the strength of the yieldable supporting action of said vehicle springs under a given load, a cam mechanism associated with the energy storing means and operatively connected with the running gear and adapted to control the energy storing means, said energy storing means and the cam mechanism being mounted for movement in unison, means operatively connected with the propelling means of the vehicle for actuation while the vehicle is in motion to utilize the energy of the propelling means of the vehicle to move the energy storing means and the cam device in unison to various positions for the accommodation of an added load to the vehicle without destroying the effect of control by the energy storing means against variations in the strength of the yielding supporting action of the vehicle springs and yet maintain a substantially normal clearance between the frame and the running gear of the vehicle, and manually controlled means for moving the energy storing means and the cam device for the purpose aforesaid when the vehicle is at rest.

12. The combination with a vehicle frame and a running gear including springs between the frame and the running gear to yieldably support the frame and permit movements between the frame and the running gear, of an energy storing means supported on said frame and having connection with an axle of the running gear to automatically release and restore energy for the control against variations in the strength of the yieldable supporting action of said vehicle springs under a given load, a cam mechanism associated with the energy storing means and operatively connected with the running gear and adapted to control the energy storing means, said energy storing means and the cam mechanism being mounted for movement in unison, and a manually operating means to move the energy storing means and the cam device in unison to various positions for the accommodation of an added load to the vehicle without destroying the control of the energy storing means against variations in the strength of the yielding supporting action of the vehicle springs and yet maintain a substantially normal clearance between the frame and the running gear of the vehicle.

13. The combination with a vehicle frame and a running gear including springs between the frame and the running gear to yieldably support the frame and permit movements between the frame and the running gear, of an energy storing mechanism supported on said frame and having connection with an axle of the running gear to release and restore energy for controlling against variations in the strength of the yieldable supporting action of said vehicle springs, said connection between the energy storing mechanism and the axle including a cam device and a swinging arm cooperating with the cam surfaces of the cam device and acting as a medium to release and restore the required energy under the control of said cam device to thereby effectively control the action of the vehicle springs against said variations in the supporting strength of the vehicle springs.

14. The combination with a vehicle frame and a running gear including springs between the frame and the running gear to yieldably support the frame on the running gear, a plurality of energy storing mechanisms supported on the frame of the vehicle and having connection with the adjacent axle of the vehicle to release and restore energy for controlling against variations in the strength of the yielding supporting action of the said springs, means connected to the vehicle and to each of said energy storing mechanisms to cause them to act in unison with each other so as to permit the aforesaid control against variations in the strength of the supporting action of said springs while the frame and running gear are in substantially parallel relation during movements between the same, and means for eliminating the said controlling action of said energy storing means when the frame and running gear assume relation other than said substantially parallel relation and thereby restoring all possible natural action of the vehicle springs to retain parallel relation of the frame and running gear under the influence of the natural characteristics of the said vehicle springs.

15. The combination of a vehicle frame and a running gear including a spring between the frame and the running gear to support the frame on said running gear and permit movements between the frame and the running gear, of a combined energy storing means and a cam mechanism constituting a powered mechanism complete in itself, said cam device having a cam surface of a contour which presents the highest portion thereof near the middle of its length and two depressions, one on each side of the high portion of the cam surface, the upper depression being of less depth than the lower depression, operative connections between the powered device and the frame of the vehicle and the running gear thereof, whereby any variance of the distance between the frame and the running gear will effect release or restoration of energy in the powered device so as to thereby control the variations in the strength of the vehicle spring and thereby maintain the body frame substantially motionless with respect to vertical displacement as the vehicle travels over uneven road surfaces.

16. The combination of a vehicle frame and a running gear including a spring between the frame and the running gear to support the frame on said running gear and permit movements between the frame and the running gear, of a combined energy storing means and a cam mechanism constituting a powered device complete in itself, said cam device including a body member having an irregular cam surface and an arm having operative connection with the energy storing means and a bearing roller carried by the arm to traverse said cam surface and arranged whereby the energy storing means maintains the bearing roller at all times against the cam surface, and a shank having an adjustable pivotal connection with said arm and also having connection with the running gear, the combined energy storing means and the cam device being operable under the influence of a release or restoration of energy under the influence of relative movement of the frame and the running gear and adapted to control variations of distance between the vehicle frame and the running gear by eliminating too great a variation in the strength of the supporting action of the vehicle spring incident to said movements between the frame and the running gear so as to thereby reduce the speed and range of movement of the frame with relation to the running gear as the vehicle travels over uneven road surfaces.

17. The combination with a vehicle frame and a running gear including a spring between the frame and the running gear to support the frame on said running gear and permit movements between the frame and the running gear, of a combined energy storing means and a cam mechanism constituting a powered device complete in itself, operative connections between the powered device and the frame of the vehicle and the running gear thereof, whereby any variance of the normal distance between the frame and the running gear will effect release or restoration of energy in the powered device so as to thereby control the variations in the distances between the frame and the running gear and maintain the frame substantially motionless with respect to vertical movement and irrespective of vertical movements of the running gear as the vehicle travels over uneven road surfaces, and means whereby to adjust said powered device for said controlling operation in accordance with an increase or decrease of vehicle loads.

18. The combination with a vehicle frame and a running gear including a spring between the frame and the running gear to support the frame on said running gear and permit movements between the frame and the running gear, of a combined energy storing means and a cam mechanism constituting a powered device complete in itself, operative connections between the powered device and the frame of the vehicle and the running gear thereof, whereby any variance of the normal distance between the frame and the running gear will effect release or restoration of energy in the powered device so as to thereby control the variations in the distances between the frame and the running gear and reduce the speed and range of movement of the frame with relation to the running gear as the vehicle travels over uneven road surfaces, and means to render said controlling means temporarily inactive when the vehicle frame tilts from normal substantially parallel relation with the running gear and permit the vehicle supporting spring to act in a more natural manner.

19. The combination with a vehicle body frame and a running gear including a vehicle spring between the body frame and the running gear to support the body frame on said running gear and permit movements between the running gear and the body frame, of means to control the strength of the supporting action of the vehicle spring, including a substantially vertically disposed shank, a spring controlled means and a cam mechanism comprising in the cam mechanism a roller and cam surface having a high point and a depression on each side thereof and one depression deeper than the other and over which high point and into and out of said depressions said roller operates under the influence of the aforesaid movements of the body and the running gear to thereby control the strength of the supporting action of said vehicle spring incident to road conditions and thereby provide for easy riding movements of the substantially inert vehicle body frame.

20. The combination with a vehicle body frame and a running gear including a resilient supporting means between the frame and the running gear to support the body frame on said running gear in spaced relation thereto and permit movements between the running gear and the body frame, of means for controlling against variations in the strength of the resilient supporting means comprising an energy storing means, a cam mechanism, and a member connected to the running gear, a shank pivotally connected at one end to said member and having operative connection with said cam mechanism, whereby upon swinging movement of said shank incident to vertical movement between the body frame and the running gear against the action of said resilient supporting means the energy storing means and the cam mechanism are actuated to force energy through the medium of the cam mechanism to thereby control against the variations in the strength of the resilient supporting means.

21. The combination with a vehicle body frame and a running gear including a spring between the frame and the running gear to support the frame on said running gear in spaced relation thereto and permit movements between the running gear and the body frame, of an energy storing device carried by the body frame and including a group of springs arranged in substantially a horizontal direction approximately at right angles to the vertical movement of the running gear, a cam mechanism operatively connected to the energy storing device and including a cam surface and a roller, and means for connecting the running gear with the energy storing device and for supporting said roller for coaction with said cam surface of the cam mechanism whereby to translate vertical movements of the running gear into horizontal movements of the energy storing device springs, whereby the vertical movements of the running gear are prevented from being directly transmitted to the body frame and the body frame movements thereby restrained with respect to a vertical movement thereof.

22. The combination with a vehicle body frame and a running gear including a spring between the body frame and the running gear to support the body frame on said running gear in spaced relation thereto and permit movements between the running gear and the vehicle, of an energy storing device carried by the body frame and having springs operable in substantially a horizontal direction approximately at right angles to the vertical movement of the running gear, and means for connecting the running gear with the energy storing device for translating vertical movements of the running gear into horizontal movements of the energy storing device springs, whereby the vertical movements of the running gear are prevented from being directly transmitted to the body frame and the body frame thereby maintained substantially motionless in respect to a vertical movement, said energy storing device springs being adapted to release or absorb power in proper degrees according to condition of the roadway whereby normal running of the vehicle will be lightly cushioned and abnormal shocks will be compensated for by the action of the springs of the energy storing device and in such a manner as to assist the vehicle spring and prevent the vehicle spring becoming a medium by which to apply such abnormal forces to the frame as to move the body frame vertically out of a substantially inert horizontal position.

23. The combination with a vehicle body frame and a running gear including a spring between the body frame and the running gear to support the frame on said running gear in spaced relation thereto and permit movements between the running gear and the body frame, of an energy storing device carried by the vehicle, and means for connecting the running gear with the energy storing device and including a cam mechanism operable in conjunction with the energy storing device to regulate the forces of the latter and with the energy storing device operate to permit vertical movements of the running gear relative to the body frame and actuate the energy storing device so as to apply its force of energy between and to the body frame and the running gear to permit vertical movements of the running gear relative to the body frame and prevent excessive variations in the supporting force of said spring and thereby maintain the frame and its load substantially motionless with respect to vertical movement.

24. The combination with a vehicle body frame and a running gear including a resilient supporting means between the frame and the running gear to support the frame on said running gear in spaced relation thereto and permit movements between the running gear and the body frame, of an energy storing means and a cam device including a cam surface of irregular contour and a roller, a swinging arm having pivotal connection with the energy storing means, said roller being mounted on said swinging arm for frictionless engagement with the cam surface of the cam device, a shank swingingly connected to the running gear and to said arm, whereby the swinging arm operates as a controlling medium between the vehicle body frame and the running gear to and through said pivoted shank to control the strength of the resilient supporting means relative to the load carried by the body frame.

25. The combination of a power propelled vehicle including a body frame and a resiliently mounted running gear wheel to support the body frame in spaced relation thereto to permit movements between the frame and the running gear, of means normally inoperative for connection with the power propelling means and having operative connection with the resiliently mounted running gear wheel, means to positively connect the last mentioned means operatively with the power propelling means whereby to utilize the power of the propelling means to adjust the supporting strength of the resilient supporting means relative to varying loads, said means for making said positive connection being under the control of the operator for effecting such positive connection and for disconnecting the said positive connecting means from the power propelling means when the proper adjustment has been made with relation to the proper distance between the frame and the running gear wheel, and an indicator cooperating in conjunction with said means for effecting operative connection with the power propelling means for observation by the operator while the said device is operating to effect said adjustment in the supporting strength of the resilient supporting means.

26. The combination with a power propelled vehicle including a body frame, a power propelling means including a transmission mechanism and a gear shift lever, and a running gear including a resilient supporting means between the body frame and the running gear to yieldably support the body frame in spaced relation to the running gear and permit movements between the body frame and the running gear, of an energy storing means supported on said frame and a cam mechanism operatively associated with said energy storing means and having operative connection with the running gear and the resilient supporting means and operating under the influence of road conditions to automatically release and restore energy for the control against excessive variations in the strength of the yieldable supporting action of said resilient supporting means under a given load, a normally inoperative connection between the power propelling means of the vehicle and the resilient supporting means, and means whereby to effect a positive operative connection between said last mentioned connecting means and the transmission mechanism so that with said gear shift lever in neutral position the energy of the momentum of the vehicle may be utilized to raise or lower the body to a desired position relative to the space between the body frame and the running gear so that the energized controlling means for the resilient supporting means can function properly in accordance with the load carried by the body frame whereby load carrying corrections may be made without laboring effort on the part of the driver, and means to positively connect the connection between the power propelling means and the resilient supporting means with the power propelling means while the vehicle is at rest.

27. The combination with a vehicle body frame and a running gear including a resilient supporting means between the body frame and the running gear to yieldably support the body frame in spaced relation to the running gear and permit movements between the body frame and the running gear, of an energy storing means supported on said body frame and a cam mechanism coupled to the energy storing means and having connection with the running gear to automatically release and restore energy for the control against variations in the strength of the yieldable supporting action of said resilient supporting means under a given load, and means to adjust the energy storing means and the cam device to various positions for the accommodation of an added load to the vehicle without destroying the effect of control by the energy storing means against variations in the strength of the yieldable supporting action of the resilient supporting means and yet maintain a substantially normal clearance between the body frame and the running gear of the vehicle.

28. The combination with a vehicle body frame and a running gear including a resilient supporting means between the body frame and the running gear to support the body frame on said running gear in spaced relation thereto and permit movements between the same, of means including an energy storing means and a cam mechanism operatively connected together between the body frame and the running gear and having operative connection with said resilient supporting means to control the supporting strength of the latter and reduce resistance to the speed and range of movement of the running gear with relation to the body frame as the vehicle meets obstructions and depressions in the roadway, means operatively connected between the power propelling means and the energy storing device and cam mechanism and operable to adjust the degree of control action of said control means on said resilient supporting means according to varying loads so as to maintain a normal degree of clearance between the body frame and the running gear, and an indicator operatively connected with said adjusting means to indicate when an adjustment to normal clearance has been effected.

29. The combination with a power propelled vehicle body frame and a running gear including a resilient supporting means between the body frame and the running gear to yieldably support the body frame in spaced relation to the running gear and permit movements between the body frame and the running gear, of means between the body frame and the running gear and operatively connected to the latter to control the supporting strength of the resilient supporting means, means for operative connection with the power propelling means of the vehicle and operable when connected therewith to adjust said control means to maintain normal space between the frame and the running gear according to varying loads and whether the vehicle is operating under its power or under momentum, and means for effecting said operative connection between said adjusting means and the power propelling means.

30. The combination with a vehicle body frame and a running gear including a resilient supporting means between the body frame and the running gear to yieldably support the body frame in spaced relation to the running gear and permit movements between the frame and the running gear, of means between the body and the running gear and operatively connected to the latter to control the supporting strength of the resilient supporting means, means for connection with the power propelling means of the vehicle and operable to adjust said control means when operatively connected to the power propelling means to maintain normal space between the body frame and the running gear according to varying loads and whether the vehicle is operating under its power or under momentum, and means operatively connected with said adjusting means for indicating when the effective degree of normal clearance between the body frame and running gear has been reached.

31. The combination with a power propelled vehicle body frame and a running gear including a resilient supporting means between the body frame and the running gear to yieldably support the body frame in spaced relation to the running gear and permit movements between the body frame and the running gear, of means mounted between the body frame and the running gear and connected to the resilient supporting means to control the supporting strength of the resilient supporting means, means normally out of operative connection with but operable for connection with the power propelling means and operable to adjust said control means when connected to the power propelling means to adjust the space between the body frame and the running gear according to varying loads and whether the vehicle is operating under its power or under momentum, means operatively connected to said adjusting means and under the control of the operator to render the control adjusting means active or inactive, and means operatively connected to said adjusting means for indicating when the effective degree of normal clearance between the body frame and running gear has been reached.

32. The combination with a vehicle body frame and a running gear including a resilient supporting means between the body frame and the running gear to yieldably support the frame on said running gear in spaced relation and permit movements between the frame and the running gear, of means operatively connected between the body frame and the running gear and having operative connection with the resilient supporting means to control the supporting strength of the latter, means operatively associated with the power propelling means and operable for connection therewith to adjust said control means so as to maintain normal space between the body frame and the running gear according to varying loads whether the vehicle is operating under its power or under momentum after its power producing driving means has become unproductive of power, and means operatively connected with said adjusting means and under the control of the operator for rendering said adjusting means active or inactive while the vehicle is in motion.

33. The combination with a power propelled vehicle body frame and a running gear including a resilient supporting means between the body frame and the running gear to space the same and to permit movements therebetween and a power transmission mechanism mounted on the body frame, of means between the body frame and the running gear and having operative connection with the resilient supporting means and including a cam mechanism to control the supporting strength of the resilient supporting means, means operative for connection with the power transmission mechanism whereby to effect an adjustment of said control means to maintain normal space between the body frame and the running gear according to varying loads and whether the vehicle is operating under its power or under momentum, and means operatively connected with the adjusting means and under the control of the operator for rendering said adjusting means active or inactive with relation to the transmission mechanism.

34. The combination with a power propelled vehicle including a propelling means and a vehicle body frame and a running gear including a resilient supporting means between the body frame and the running gear to yieldably support the body frame on said running gear in spaced relation thereto and permit movements between the same, of means arranged between the body frame and the running gear and operatively connected to the resilient supporting means to control the supporting strength of the resilient supporting means under normal riding conditions, means operatively connected between said control means and the power controlling means of the vehicle and operable to adjust said control means to maintain a normal space between the body frame and the running gear in the event of an overload on the frame to correct the excess spacing between the body frame and the running gear which would follow if not corrected after the overload has been removed from the body frame of the vehicle.

35. The combination with a power propelled vehicle including a body frame and a running gear and a resilient supporting means between the body frame and the running gear to resiliently support the body frame on said running gear in spaced relation thereto and permit movements between the same, of means arranged between the frame and the running gear and operatively connected to the resilient supporting means to control the supporting strength of the resilient supporting means, and means arranged for connection with the power means of the vehicle for coaction with the power means to adjust said control means to maintain normal space between the body frame and the running gear when an overload is placed on the body frame and also to correct any undesirable excess spacing between the body frame and the running gear after the overload has been removed from the body frame of the vehicle due to the first named correction.

36. The combination with a vehicle body frame and a running gear including a resilient supporting means between the frame and the running gear to resiliently support the frame on said running gear in spaced relation thereto and permit movements between the same, of energy storing means carried by the vehicle and including compressible springs and having operative connection with the resilient supporting means and capable of storing energy in excess to the requirement necessary for controlling the resilient supporting strength of said resilient supporting means to thereby control the supporting strength thereof, and regulating means to adjust the degree of compression of the compressible springs of the energy storing device so as to govern the degree of energy releasable from said energy storing device for controlling the supporting strength of the resilient supporting means and thereby confining to the running gear substantially vertical movement coincident to the vehicle body being substantially immune to said running gear vertical movement.

37. The combination with a vehicle body frame and a running gear including springs between the body frame and the running gear to yieldably support the body frame in spaced relation thereto and permit movements between the body frame and the running gear, of means mounted on the body frame including compressible springs for storing energy for controlling the resilient supporting strength of said running gear springs and in excess of energy required for controlling the running gear springs so as to maintain the running gear springs relatively near constant supporting strength and thereby minimizing the speed of the body movement relative to the running gear incident to travel over uneven roadways, and means for adjusting the degree of energy supplied by said energy storing springs to control said running gear springs according to varying loads as the vehicle travels over a roadway.

38. The combination with a power propelled vehicle including a body frame and a running gear including a wheel, a power propelling means, and a resilient supporting means located between the body frame and the running gear to maintain the body frame and the running gear yieldably spaced apart, of spring means and a cam mechanism coupled together and supported between the frame and running gear and having operative connection with the resilient supporting means, means mounted on the body frame for operative connection with the power propelling means of the vehicle and having normal operative connection with the resilient supporting means so that when connected to the power propelling means, to effect control of the strength of the resilient supporting means according to varying loads placed on or removed from the body frame and thereby maintain the normal spacing between the vehicle body frame and the running gear according to varying loads, and means operatively connected with the said control means whereby to actuate the latter.

39. The combination with a vehicle body frame and a running gear including a front spring and a rear spring between the body frame and the running gear, of means arranged between the body frame and the running gear and operatively connected to the front spring whereby to control the strength of the front spring to maintain a nearly uniform strength of the front spring under varying movements of same, means arranged between the body frame and the running gear and operatively connected with the rear spring to maintain a nearly uniform strength of the rear spring under varying movements of same, operative connecting means between both of the aforesaid spring controlling means so that as the vehicle travels over roadways the body frame and running gear maintain substantially parallel relation, and means operatively connected with both of the aforesaid spring controlling means and to the aforesaid connecting means and operable to render temporarily inactive the rear spring controlling means when the vehicle body frame tilts from normal substantially parallel relation with the running gear.

40. The combination with a vehicle body frame, a running gear and a resilient supporting means between the body frame and the running gear, of means located between the body frame and the running gear for controlling the resilient supporting strength of the resilient supporting means incident to uneven road surfaces or to varying loads as the vehicle follows a substantially straight course, with the body frame and the running gear in substantially parallel relation, and means mounted on the body frame and operatively connected to the said resilient supporting means for automatically preventing said control means from functioning to control the strength of the supporting means when the body frame tilts out of substantially parallel relation with the running gear as when the vehicle changes direction of movement from a straight course to make a turn.

41. The combination with a vehicle body frame, a running gear and a resilient supporting means between the body frame and the running gear, of means mounted on the frame and operatively connected to the resilient supporting means for controlling the resilient supporting strength of the resilient supporting means incident to movement due to uneven road surfaces or to varying loads as the vehicle follows a substantially straight course with the body frame and the running gear in substantially parallel relation, and means operatively connected with the aforesaid control means for automatically eliminating said control means from functioning to control the strength of the supporting means when the body frame tilts out of substantially parallel relation with the running gear as when the vehicle changes direction of movement from a straight course to make a turn, said automatic eliminating means permitting automatic return of said control means to normal operating condition upon return of substantially parallel relation of the body frame and running gear after such movement of the vehicle in making a turn.

42. The combination with a power propelled vehicle including a yieldably supported body and a supporting running gear therefor spaced therefrom below the body, of means operatively connected to the body and the running gear and including a device operative for connection with the power propelling means of the vehicle to provide for a predetermined spacing relation between the body and the running gear when operatively connected to the power propelling means irrespective of capacity varying loads placed on or removed from the body and means for operatively connecting said device to the power propelling means.

43. The combination with a power propelled vehicle including a yieldably supported body and a supporting running gear therefor spaced therefrom below the body, of means operatively connected to the body and to the running gear and including a gear mechanism operative for connection with the power propelling means of the vehicle and operable under the control of the operator for connection with the power propelling means to maintain a desired space between the body and the running gear irrespective of capacity varying loads placed on or removed from the body, and whether the vehicle is in motion or at rest, and a clutch device operable between the power propelling means and said gear mechanism to effect operative connection between the same.

44. The combination with a power propelled vehicle including, a transmission mechanism, a yieldably supported body and a supporting running gear therefor and a power transmission, of means operatively connected with the yieldably supported body and the running gear and arranged for operative connection with the transmission mechanism and under the control of the operator for maintaining a predetermined desired space between the body and the running gear irrespective of capacity varying loads placed on or removed from the body.

45. The combination with a power propelled vehicle including a power driving means, a supporting running gear spaced below the body, and a resilient supporting means for the body, of means for controlling the normal strength of the resilient supporting means and including a device for operative connection with the power driving means of the vehicle and under the control of the operator being operatively connected to the power driving means and unconnected therewith to act upon the said controlling means to selectively increase or decrease the space between the yieldably supported body and the running gear according to varying capacity loads placed on or removed from the body.

46. The combination with a power driven vehicle including a body and a running gear therefor below the same in spaced relation thereto and resilient body supporting means for the body arranged between the body and the running gear, of means located between the body and the running gear and operatively connected to the resilient body supporting means for controlling the strength of said resilient supporting means to maintain a desired clearance between the body and the running gear as the vehicle travels over a straight course, said controlling means becoming inactive for maintaining said control over the resilient supporting means when the body of the vehicle tilts out of normal substantially parallel relation with the running gear as when the vehicle makes a turn in the roadway.

47. The combination with a power propelled vehicle including a body, a running gear including a wheel, and a resilient supporting means to yieldably space the body and running gear, of means including a device operatively connected with the body and the resilient supporting means and arranged for connection with the power propelling means of the vehicle and operable under the control of the operator to utilize the energy of the power propelling means to change the supporting strength of the resilient supporting means according to varying loads placed upon or removed from the vehicle body so as to maintain normal spacing between the vehicle body frame and running gear according to the varying loads, and means for resisting stresses on the steering axle to prevent rotational movement of the axle due to action of the energy storing means.

48. The combination with a power propelled vehicle including a body, a running gear including a wheel, a transmission mechanism, a gear shift lever and a clutch mechanism and a resilient supporting means to yieldably space the body and running gear, of means including a device normally inoperatively connected with the transmission mechanism and having connection with said resilient supporting means of the vehicle, and means to effect operative connection of said device with said transmission mechanism when the gear shift lever is in neutral position and when the clutch mechanism is disconnected so that the energy of the transmission mechanism of the propelling means may be utilized to change the supporting strength of the resilient supporting means according to varying loads placed upon or removed from the vehicle body so as to maintain normal space between the vehicle body frame and the running gear according to the varying loads.

49. The combination with a power propelled vehicle including a body, a running gear including a wheel, a transmission mechanism, a gear shift lever, a clutch mechanism and a resilient supporting means to yieldably space the body of the running gear, of means including a device normally inoperatively connected with the transmission mechanism and having operative connection with the resilient supporting means of the vehicle, and means operable under the control of the operator whereby to operatively connect said device and said transmission mechanism, when the gear shift lever is in neutral position and the clutch mechanism disconnected, so that the energy of the transmission mechanism of the propelling means may be utilized to change the supporting strength of the resilient supporting means according to varying loads placed upon or removed from the vehicle body and thereby maintain normal spacing between the vehicle body frame and the running gear according to the varying loads, said means for changing the resilient supporting strength of the resilient supporting means being operable at the will of the operator to disconnect same from the transmission mechanism when the desired adjustment has been effected.

50. The combination with a power propelled vehicle including a body frame, a running gear, a resilient supporting means between the frame and the running gear to permit movement between the frame and the running gear and including a pair of rear springs, and a transmission mechanism mounted on the frame, of a pair of devices each including energy storing means and a cam mechanism and which are operatively connected with the body frame and the respective rear springs to control the strength of the springs under normal riding conditions and to maintain a normal predetermined spacing between the frame and the running gear, means for adjusting said control means for the springs to maintain the normal predetermined space between the frame and the running gear under varying capacity loads including a rocker shaft supported transversely on the frame, means operatively connecting said rocker shaft and said control means, a gear mechanism for operative connection with the transmission mechanism, an operative connection between said rocker shaft and said gear mechanism, and means to connect and disconnect said gear mechanism with the transmission mechanism and when said gear mechanism is operatively connected to the transmission mechanism to act upon said rocker shaft through the connections therebetween and said gear mechanism and therebetween and said spring control means so as to adjust the latter for operation to maintain the normally predetermined space between the frame and the running gear under varying capacity loads on the rear of the frame of the vehicle.

51. The combination with a power propelled vehicle including a body frame, a running gear, a resilient supporting means between the frame and the running gear and including a pair of rear springs, and a power propelling means, of a rear pair of devices including energy storing means and cam mechanisms operatively connected with the body frame and the respective springs to control the strength of the springs under normal riding conditions and maintain a normal predetermined spacing relation between the body frame and the running gear, means for adjusting said control means to maintain the normal predetermined space between the frame and the running gear under varying capacity loads including a rocker shaft supported transversely on the body frame, means operatively connecting the rocker shaft and the said control means, means mounted on the frame for operative connection with the power propelling means, an operative connection between said rocker shaft and the last mentioned connecting means, and means to connect said last mentioned connecting means with the power propelling means and when so connected operable to act upon said spring control means to adjust the latter for operation so as to maintain the normally predetermined space between the frame and the running gear under varying capacity loads on the rear of the body frame of the vehicle.

52. The combination with a power propelled vehicle including a power driving means, a body frame, a running gear, a resilient supporting means between the frame and the running gear and including a rear spring, of a swingingly mounted device including energy storing means and a cam mechanism coupled together and operatively connected with the body frame and with said spring to control the strength of the latter under normal riding conditions and to maintain a normal predetermined relation between the frame and the running gear, and means for swinging said coupled device for adjusting said control means for the spring to maintain the normal predetermined spacing relation between the body frame and the running gear under varying capacity loads, including a rocker shaft supported on the body frame, means operatively connecting the rocker shaft and said control means, means mounted on the frame for operative connection with the power propelling means, an operative connection between said rocker shaft and said means for connection with the power transmission mechanism, and means to connect and disconnect said connecting means with relation to the power propelling means and when so connected rock said rocker shaft and through the connections between the rocker shaft and said control means to adjust the latter for operation to maintain the normally predetermined spacing relation between the frame and the running gear according to varying capacity loads carried by the body of the vehicle.

53. The combination with a powered propelled vehicle including a frame, a running gear therefor and a resilient supporting means between the frame and the running gear, of means including a cam mechanism operable to assist movement of the running gear toward and away from the body frame and adjustably control the strength of the resilient supporting means to maintain a predetermined normal degree of space between the frame and the running gear, and means associated with said adjusting means for indicating the supporting strength of the resilient supporting means.

54. The combination with a powered propelled vehicle including a frame, a running gear therefor, and a resilient supporting means between the frame and the running gear, of means to adjustably control the strength of the resilient supporting means to maintain a predetermined normal degree of space between the frame and the running gear, said adjusting means including an energy storing device and a cam mechanism, and means associated with said adjusting means for indicating the degree of space between the frame and the running gear.

55. The combination with a powered propelled vehicle including a frame, a running gear therefor, and a resilient supporting means between the frame and the running gear, of means to adjustably control the strength of the resilient supporting means to maintain a predetermined normal degree of space between the frame and the running gear, said adjusting means including an energy storing device and a cam mechanism, and means for swingingly supporting the energy storing device and the cam mechanism.

56. The combination with a powered propelled vehicle including a frame, a running gear therefor, and a resilient supporting means between the frame and the running gear, of means to adjustably control the strength of the resilient supporting means to maintain a predetermined normal degree of space between the frame and the running gear, said adjusting means including an energy storing device and a cam mechanism, means for swingingly supporting the energy storing device and the cam mechanism, and means associated with said adjusting means for indicating the degree of space between the frame and the running gear.

57. The combination with a powered propelled vehicle including a frame, a running gear therefor, a power propelling means and a resilient supporting means between the frame and the running gear, of means between the frame and the running gear including a cam mechanism and operatively connected to the resilient supporting means and coacting with the latter to assist movement of the running gear toward or from the body frame and to control the strength of the resilient supporting means to maintain a predetermined normal degree of spaced relation between the frame and the running gear under ordinary driving conditions, means for detachable connection with the propelling power means of the vehicle and when operatively connected to the control means operating to adjustably control the strength of the resilient supporting means under varying capacity loads, means for actuating the means for connection with the power propelling means, and an indicator connected with the adjusting means for indicating the supporting strength of the resilient supporting means.

58. The combination with a power propelled vehicle including a frame, a running gear therefor, a transmission mechanism and a resilient supporting means between the frame and the running gear, of means operatively connected to the resilient supporting means to control the action of the resilient supporting means, and means to detachably connect said means to the transmission mechanism of the vehicle and when operatively connected with the transmission mechanism operating to adjust the supporting action of the resilient supporting means to maintain a predetermined normal spaced relation between the frame and the running gear irrespective of varying loads and whether the vehicle is moving or at rest.

59. The combination with a power propelled vehicle including a frame, a running gear therefor, a transmission mechanism operatively connected with the power propelling means and a resilient supporting means between the frame and the running gear, of means operatively connected to the resilient supporting means to control the action of the resilient supporting means, means to detachably connect said means to the transmission mechanism of the power propelling means of the vehicle and when operatively connected therewith operable to thereby adjust the supporting action of the resilient supporting means to maintain a predetermined normal spaced relation between the frame and the running gear irrespective of varying loads and whether the vehicle is moving or at rest, and an indicator operatively connected with said adjusting means for coaction therewith for indicating the supporting strength of the resilient supporting means.

60. The combination with a power propelled vehicle body frame and a running gear including a resilient supporting means between the body frame and the running gear to yieldably support the body frame in spaced relation to the running gear and permit movements between the body frame and the running gear, of means mounted between the body frame and the running gear and connected to the latter and to the resilient supporting means to control the supporting strength of the resilient supporting means, means normally out of operative connection with but operable for connection with the power propelling means of the vehicle to adjust said control means when connected to the power propelling means so as to adjust the space between the body frame and the running gear according to varying loads and whether the vehicle is operating under its power or under momentum, and means operatively connected to said adjusting means and under the control of the operator to render the control adjusting means active or inactive.

61. The combination with a vehicle body frame and a running gear including a resilient supporting means between the body frame and the running gear to space the same and to permit movements between the same, of an energy storing means mounted on the frame and including a plurality of compressible springs and a cam mechanism including a cam element having an irregular cam contour and a roller and operatively coupled to the energy storing means and supported between the body frame and the running gear and having operative connection with the running gear and with the resilient supporting means to adjust the degree of stored energy by increasing and decreasing the pressure on said energy storing springs in accordance with the position of said cam roller on said cam contour so as to thereby control the strength of the resilient supporting means through the operation of said cam roller riding over said cam contour incident to ordinary road conditions including minor rough places in the roadway and thereby effectively balancing the resilient supporting forces and provide for easy riding and under abnormal road conditions, which tend to create a greater than an ordinary throw of the running gear toward the body frame, providing additional energy progressively in proper degrees of strength to the resilient supporting means as the cam roller rides to different locations on said irregular cam contour of the cam mechanism to thereby prevent shock contact of running gear parts or contact of the resilient supporting means with the body frame and also capable of controlling the resilient supporting means relative to movement of the running gear away from the body frame after abnormal shocks so as to prevent the body frame from descending quickly when the running gear moves away from the body frame.

62. The combination with a vehicle body frame and a running gear including springs between the body frame and the running gear to support the body frame on said running gear spaced from the latter and permit movements between the body frame and the running gear, of means mounted on the body frame and including a device having a plurality of compressible helical springs for storing energy relative to the supported load on said vehicle springs in excess of energy for the requirements for controlling the resilient supporting strength of said vehicle springs, and regulating means operatively connected to the energy storing means and to the vehicle springs to adjust the degree of compression of the energy storing device springs to reduce the excessive degree of stored energy to a desirable degree of stored energy for controlling said vehicle springs under ordinary conditions as the vehicle travels over uneven road surfaces and thereby permit said movements by eliminating too great a variation in the strength of the supporting action of the vehicle springs incident to such movements to thereby reduce the speed and range of movement of the body frame with relation to the running gear as the vehicle travels over uneven road surfaces.

63. The combination with a power propelled vehicle body frame and its aggregate load weight, a running gear having a wheel with less aggregate weight than said body frame and load and a resilient supporting means connected between said body frame and said running gear to resiliently support the former on the latter in spaced relation thereto and permit movements therebetween, of means embodying a device which is provided with potential energy and a cam surface, said device operating to control the supporting strength of the resilient supporting means so as to permit movement of the running gear toward or from the body frame without the natural increase or decrease of the supporting strength of the resilient supporting means usually due to said running gear vertical movement toward or from the body frame, said controlling means being inactive as a resilient supporting means strength control after the running gear has reached determined distances toward or from the body frame, said controlling means being capable of exerting a controlling force relative to body frame load weight, said controlling force being resisted by the inertia of the body frame load weight above thereby creating an increase in the speed, range and periodicity of movement in the lighter running gear due to the power of said controlling force as the vehicle travels over an uneven roadway, and means under the control of the operator to regulate said controlling means to provide a strength of resilient support to create a desired clearance between the body frame and the running gear regardless of capacity carried loads by utilizing the energy of the propelling means and or by a manually operated means for the purpose of regulating said clearance between said body frame and said running gear, relative to variations in load weight.

GEORGE H. TABER.

CERTIFICATE OF CORRECTION

Patent No. 1,971,541.  August 28, 1934.

George H. Taber.

It is hereby certified that error appears in the above numbered patent requiring correction as follows: In the drawings, Sheet 4, figure 12, should appear as shown below instead of as shown in the patent—

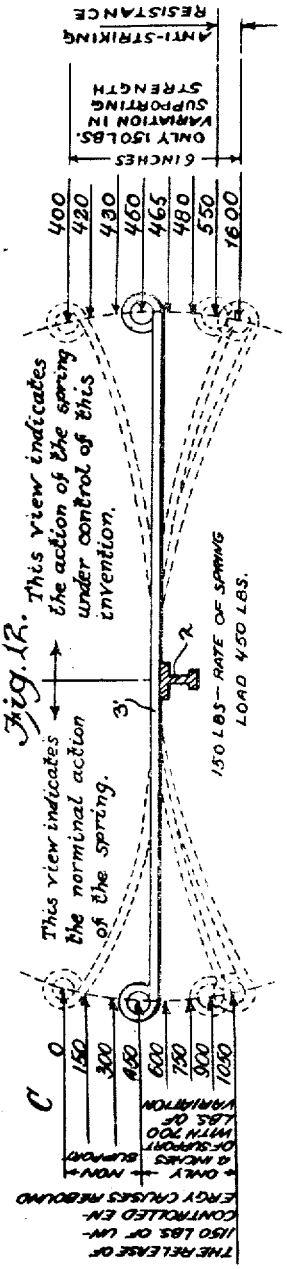

and that the said Letters Patent should be read with this correction therein that the same may conform to the record of the case in the Patent Office.

Signed and sealed this 20th day of November, A. D. 1934.

(Seal.)

Leslie Frazer
Acting Commissioner of Patents.